(12) United States Patent
Wakito

(10) Patent No.: US 8,035,684 B2
(45) Date of Patent: Oct. 11, 2011

(54) IMAGE-SIGNAL GENERATING APPARATUS

(75) Inventor: Sumio Wakito, Shirakawa (JP)

(73) Assignee: Olympus Corporation, Tokyo (JP)

( * ) Notice: Subject to any disclaimer, the term of this patent is extended or adjusted under 35 U.S.C. 154(b) by 1336 days.

(21) Appl. No.: 10/952,417

(22) Filed: Sep. 28, 2004

(65) Prior Publication Data

US 2005/0073589 A1 Apr. 7, 2005

(30) Foreign Application Priority Data

Oct. 2, 2003 (JP) .................................. 2003-344930

(51) Int. Cl.
*H04N 7/12* (2006.01)
(52) U.S. Cl. ................ 348/65; 348/66; 348/67; 348/68; 348/69; 348/70; 348/71; 348/72; 348/73; 348/74; 348/75; 348/76
(58) Field of Classification Search ................ 348/65–76
See application file for complete search history.

(56) References Cited

U.S. PATENT DOCUMENTS

| 4,424,456 A * | 1/1984 | Shiraki et al. ................ 327/111 |
| 4,803,550 A * | 2/1989 | Yabe et al. ...................... 348/68 |
| 4,926,258 A * | 5/1990 | Sasaki et al. .................... 348/72 |
| 5,805,214 A * | 9/1998 | Nishizawa et al. ......... 348/231.8 |
| 5,999,211 A * | 12/1999 | Hedges et al. ................ 348/144 |
| 6,043,839 A * | 3/2000 | Adair et al. ..................... 348/76 |

FOREIGN PATENT DOCUMENTS

JP 7-171096 7/1995

* cited by examiner

*Primary Examiner* — Jay Patel
*Assistant Examiner* — Geepy Pe
(74) *Attorney, Agent, or Firm* — Scully, Scott, Murphy & Presser, P.C.

(57) ABSTRACT

An image-signal generating apparatus comprises a solid-state image pickup device-equivalent load circuit unit including a load approximately equivalent to a solid-state image pickup device such as a charge coupled device, etc. The image-signal generating apparatus further comprises an image-signal generating circuit for generating an image signal corresponding to an output signal output from the solid-state image pickup device through the solid-state image pickup device-equivalent load circuit unit, which is a load to which a driving signal for driving the solid-state image pickup device is applied.

31 Claims, 23 Drawing Sheets

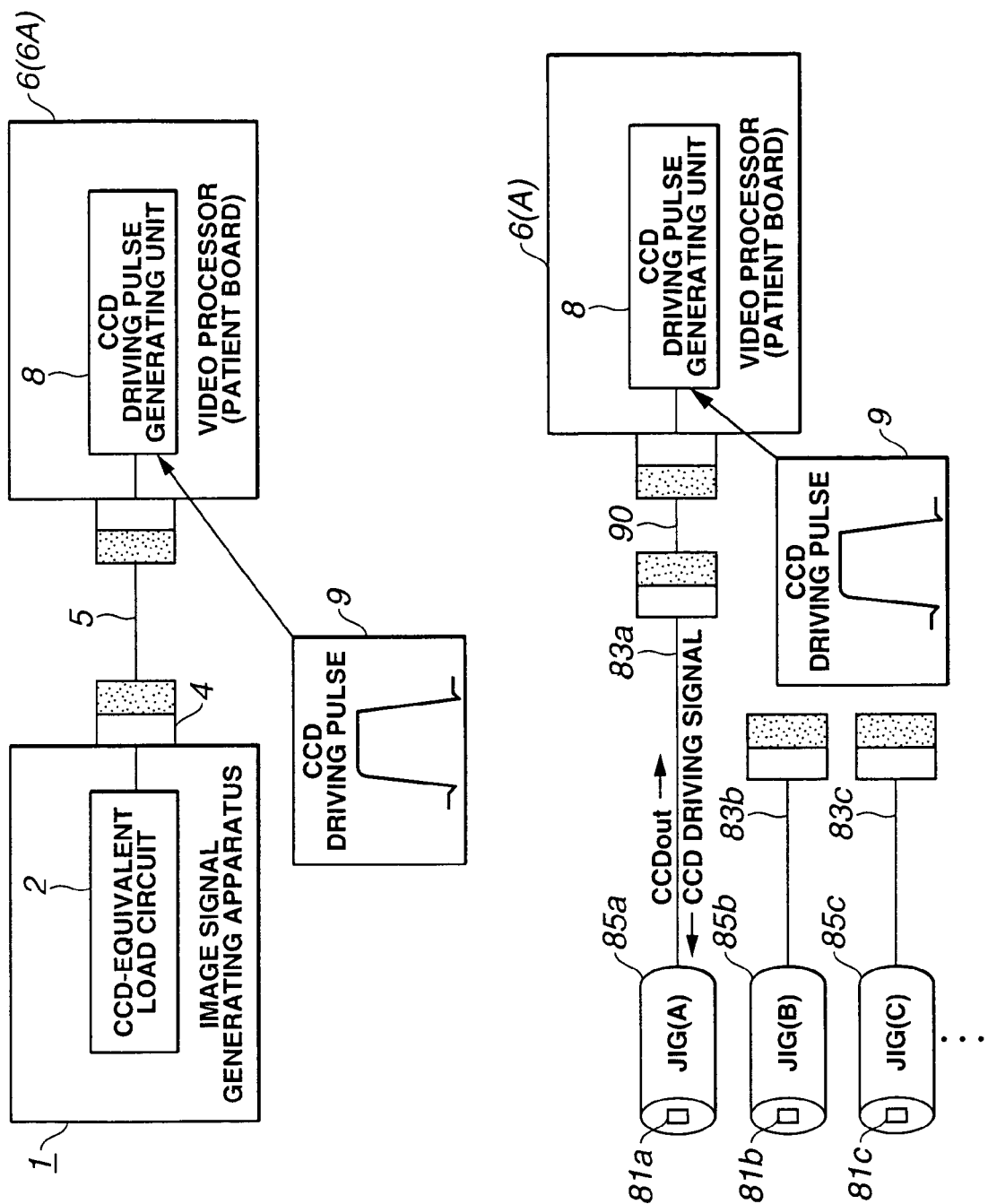

IMAGE-SIGNAL GENERATING APPARATUS

This application claims benefit of Japanese Application No. 2003-344930 filed on Oct. 2, 2003, the contents of which are incorporated by this reference.

BACKGROUND OF THE INVENTION

1. Field of the Invention

The present invention relates to an image-signal generating apparatus for inspecting or adjusting an image-signal processing apparatus such as an endoscope video processor, etc. which performs signal processing in a solid-state image pickup device.

2. Description of the Related Art

For example, in endoscope apparatuses, television cameras having solid-state image pickup devices (collectively referred to as electronic endoscopes) are widely used, the television cameras being attached to electronic endoscopes or optical endoscopes for performing endoscopy, which are mounted with solid-state image pickup devices such as charge coupled devices (hereinafter, abbreviated as CCD), which have inserting units which are inserted into body cavities, etc.

In this case, the television cameras or the electronic endoscopes mounted with CCD are connected to endoscope video processors (or may be referred to as camera control units and hereinafter indicated as (endoscope) video processors) as image-signal processing units comprising driving systems for driving the CCD and signal processing systems for performing signal processing of generating standard image signals on the basis of output signals (which are displayed in monitors) output from the driven CCD. Further, a process of generating the standard image signals is carried out by the video processors and endoscopic images taken by the CCD are displayed in monitors.

A process of inspecting the video processors includes a substrate inspecting process in which adjustment and inspection are performed to each substrate and a body inspecting process in which inspection is performed to a combination thereof, that is, to the whole system.

Here, details of the inspection are as follows.

The inspection (adjustment) of substrates is carried out in accordance with the following flow:

(1) Adjustment of a pulse generating unit for driving the CCD;
(2) Adjustment of phase of CDS pulses;
(3) Adjustment of gains of image signals obtained from the CCD; and
(4) Other level adjustment.

In adjustment of the CCD driving pulses, since image quality depends largely upon phases, pulse widths, amplitudes thereof, it is required that they should be strictly managed. Further, in adjustment of the CDS pulses, similarly, the management of phases thereof is very important.

As shown in FIG. 24, it is required that output timings of both CDS pulse 1 SHP and CDS pulse 2 SHD for performing correlated double sampling (abbreviated as CDS) to image signals CCDout as CCD output signals output from the CCD should be adjusted.

Further, while a reset portions, etc. have angulated waveforms having small distortion as indicated by a solid line for the purpose of simplifying image signals CCDout output from the CCD in FIG. 24, the image signals in a case of inspection and adjustment in the conventional example really have rounded waveforms having large distortion as indicated by a two-dotted dash line, so that boundary portions among a reset portion, a feed-through portion, and a data portion are not exhibited clearly.

Further, in order to inspect a substrate, the inspection of image quality is carried out by taking images of various charts such as white, color bar, gray scale, etc.

In a first conventional example, the adjustment and inspection in accordance with the aforementioned (1) to (4), as shown in FIG. 25, are carried out using an inspection jig (head jig) 85 comprising a substrate 82 substantially mounted with a CCD 81, a scope cable 83 used for an endoscope (scope), and a unit 84 having a lens, an iris, and an ND filter. Then, a connector 86 at an end of the scope cable 83 is connected to a video processor to be inspected and adjusted, and then the video processor is inspected and adjusted.

In Japanese Unexamined Patent Application Publication No. 7-171096 as a second conventional example, an automatic adjustment unit for a video processor is disclosed, which outputs a test signal to a video processor by inputting a solid-state image pickup device driving signal from the video processor and automatically adjusts set values of the video processor by comparing the test signal processed by the video processor with a target value, etc.

SUMMARY OF THE INVENTION

An image-signal generating apparatus for generating an image signal according to the present invention has a solid-state image pickup device-equivalent load circuit unit comprising a load which is approximately equivalent to a solid-state image pickup device; and an image-signal generating circuit for generating an image signal corresponding to an output signal output from the solid-state image pickup device.

BRIEF DESCRIPTION OF THE DRAWINGS

FIGS. 1 to 16A are diagrams explaining a first embodiment of the present invention in which:

FIG. 1 is a diagram schematically illustrating a structure of an image-signal generating apparatus according to the first embodiment of the present invention;

FIG. 2 is a block diagram illustrating respective constituent elements of the image-signal generating apparatus and waveform diagrams thereof;

FIG. 3 is a circuit diagram illustrating a CCD-equivalent load circuit;

FIG. 4A is an explanatory diagram illustrating a state where a video processor is inspected using the image-signal generating apparatus;

FIG. 4B is an explanatory diagram illustrating a state where the video processor is inspected using a method of the first conventional example;

FIG. 5 is a circuit diagram illustrating a CCD-equivalent load circuit corresponding to various CCDs;

FIG. 6 is a circuit diagram illustrating a CCD-equivalent load circuit corresponding to a modified example of FIG. 5;

FIG. 7 is a circuit diagram illustrating a specific circuit structure of the CCD-equivalent load circuit and an attenuator of FIG. 2;

FIG. 8 is a circuit diagram illustrating a specific circuit structure of a reset-pulse generating unit of FIG. 2;

FIG. 9 is a circuit diagram specifically illustrating a delay circuit of a PPL/delay circuit of FIG. 2;

FIG. 10 is a circuit diagram illustrating a specific circuit structure of a digital-to-analog converter data generating unit provided at an output portion of a digital-to-analog converter of FIG. 2;

FIG. 11 is a circuit diagram illustrating a specific circuit structure of a CCDout generating unit of FIG. 2;

FIG. 12 is a diagram illustrating a state where the delay circuit is provided in the PLL/delay circuit of the image-signal generating apparatus;

FIG. 13 is a circuit diagram illustrating a structure in which a delay amount of the delay circuit of FIG. 12 can be substantially switched and selected;

FIG. 14 is a circuit diagram illustrating a specific circuit structure of a modified example in which a pulse width is varied in the reset-pulse generating unit of FIG. 8;

FIG. 15 is a circuit diagram illustrating a specific circuit structure of a modified example in which the pulse width is varied using a delay line in the reset-pulse generating unit of FIG. 8;

FIG. 16A is an explanatory diagram illustrating an output waveform of CCDout generated in the first embodiment and a state where a phase of a CDS pulse is adjusted using the output waveform; FIGS. 17 to 22 are diagrams explaining a second embodiment of the present invention in which:

FIG. 17 is a diagram schematically illustrating a structure of an image-signal generating apparatus according to the second embodiment of the present invention;

FIG. 18 is a block diagram illustrating in more detail the structure of FIG. 17;

FIG. 19 is a circuit diagram illustrating a structure of a CCD-equivalent load circuit which is equivalent to various CCDs;

FIG. 20 is a circuit diagram illustrating a structural example of the PLL/delay circuit;

FIG. 21 is a circuit diagram illustrating a structural example of the PLL/delay circuit in a modified example of FIG. 20; and FIG. 22 is a circuit diagram illustrating a structural example of the PLL/delay circuit in a modified example of FIG. 20.

DETAILED DESCRIPTION OF THE PREFERRED EMBODIMENTS

Now, embodiments of the present invention will be described in detail with reference to the attached drawings.

First Embodiment

A first embodiment of the present invention will be described with reference to FIGS. 1 to 16A.

Figure 1:
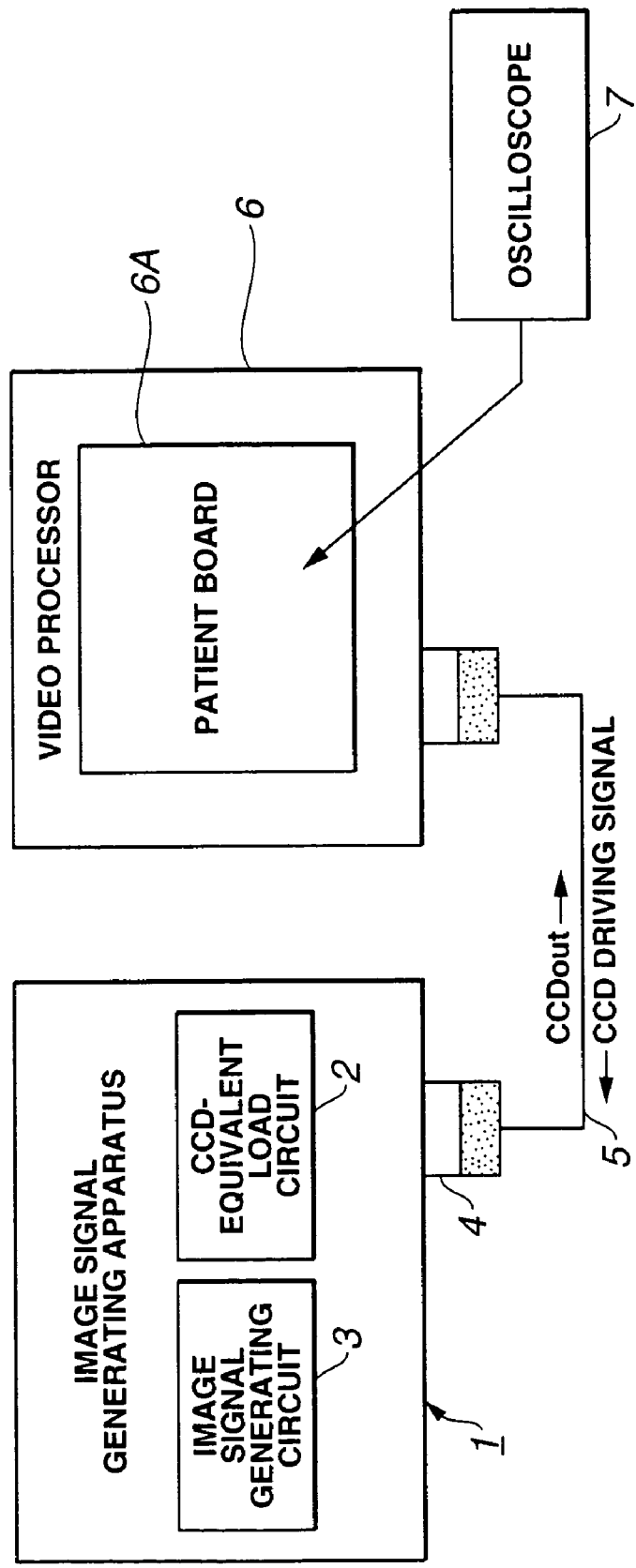

As shown in FIG. 1, an image-signal generating apparatus 1 according to the first embodiment of the present invention has a CCD-equivalent load circuit 2 which is set so as to have a load equivalent to a charge coupled device (abbreviated as CCD) as an actual solid-state image pickup device, and an image-signal generating circuit 3 which outputs (generates) a CCD output signal which is approximately equal to a driving signal which is applied to an actual CCD when a CCD driving signal (CCD driving pulse) is applied to the CCD-equivalent load circuit 2.

A connector 4 provided on the front surface of the image-signal generating apparatus 1 is connected to a (endoscope) video processor 6 as an image-signal processing unit, which is an inspection target, via a connection cable 5. An oscilloscope 7 for observing waveforms, etc. is connected to a patient substrate 6A of the video processor 6.

Figure 2:
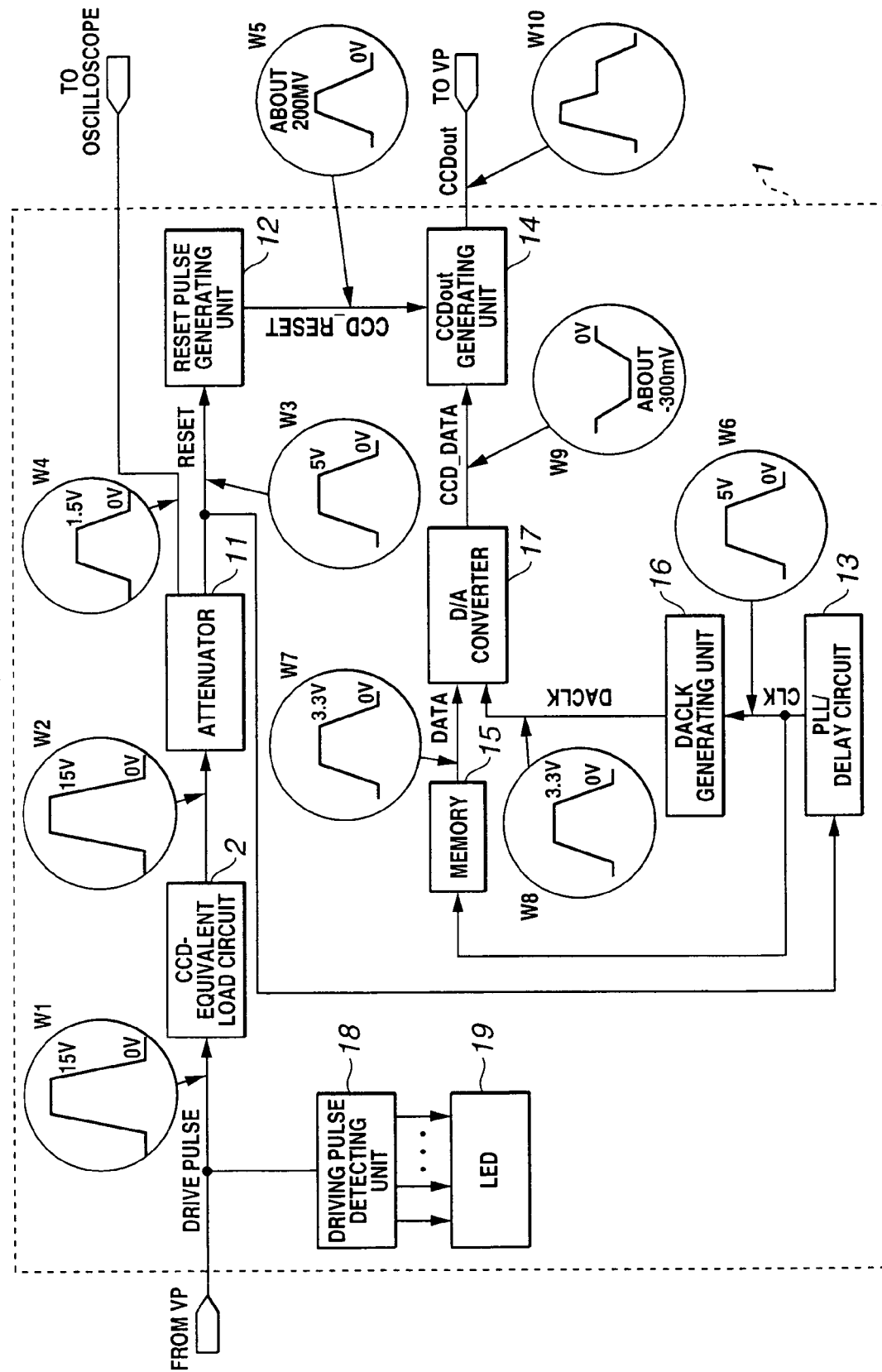

FIG. 2 shows an internal structure and signal waveform diagrams of respective constituent elements of the image-signal generating apparatus 1 shown in FIG. 1. Here, the image-signal generating apparatus 1 is connected to the video processor (abbreviated as VP in FIG. 2) 6 which is an inspection (or adjustment) target, so that an image signal which is synchronized with a CCD driving pulse of the video processor 6 and is approximately equivalent to an image signal output from the actual CCD is output to the video processor 6 from the image-signal generating apparatus 1.

Further, in the first embodiment as described later, the image signal which is approximately equivalent to the image signal output from the actual CCD is generated. However, while the image signal output from the actual CCD has a waveform having large distortion, the first embodiment is characterized in that the image signal which has a waveform having small distortion and close to an ideal waveform is generated.

Further, by outputting the image signal in a waveform having small distortion, the adjustment of an output timing (phase) of a CDS (Correlated Double Sampling) pulse in a CDS circuit can be carried out easily and with a suppressed deviation.

In this way, by outputting the image signal, which is approximately equivalent to the signal output from the actual CCD, to the video processor 6, the inspection (adjustment) of the aforementioned (2), that is, the phase adjustment of the CDS pulse, etc. can be carried out without using a head jig mounted with the CCD.

As shown in FIG. 2, the CCD driving pulse as the CCD driving signal (indicated as DRIVE PULSE in FIG. 2) output from (the driving pulse generating unit of) the video processor 6 (which is an inspection target) is applied to the CCD-equivalent load circuit 2. The pulse waveform of the CCD driving pulsein this case is indicated as a waveform W1.

The CCD driving pulse is output in a waveform W2 from the output terminal with the waveform varied or almost not varied in accordance with the load of the CCD-equivalent load circuit 2. Further, in FIG. 2, an attenuator 11, etc. other than the CCD-equivalent load circuit 2 constitutes the image-signal generating circuit 3.

The signal from the output terminal of the CCD-equivalent load circuit 2 is attenuated by the attenuator 11 (for example, in order to facilitate the signal processing at the next stage), and then is output in a waveform W3 to the reset-pulse (CCD_RESET in FIG. 2) generating unit 12 for generating a reset pulse and the PLL/delay circuit 13 for performing a process of generating a CCD output signal synchronized with the driving pulse.

Further, the signal having the waveform W4 attenuated (to be larger than the waveform W3) by the attenuator 11 is output to the oscilloscope 7 for monitoring waveforms.

The reset-pulse generating unit 12 generates a reset pulse having a waveform W5 from the waveform W3 and outputs the generated reset pulse to the CCDout (CCD output signal) generating unit 14.

On the other hand, the PLL/delay circuit 13 generates a clock CLK having a waveform W6 synchronized with the signal input thereto and outputs the generated clock CLK to the memory 15 and the DACLK generating unit 16.

Data corresponding to various charts are stored in the memory 15, and data having a waveform W7 are read out in response to application of the clock CLK and output to the digital-to-analog converter 17.

Further, the DACLK generating unit 16 adjusts the phase of the clock CLK output from the PLL/delay circuit 13, generates a clock DACLK having a waveform W8 used for the digital-to-analog conversion, and applies the generated clock DACLK to the digital-to-analog converter 17.

Figure 10:
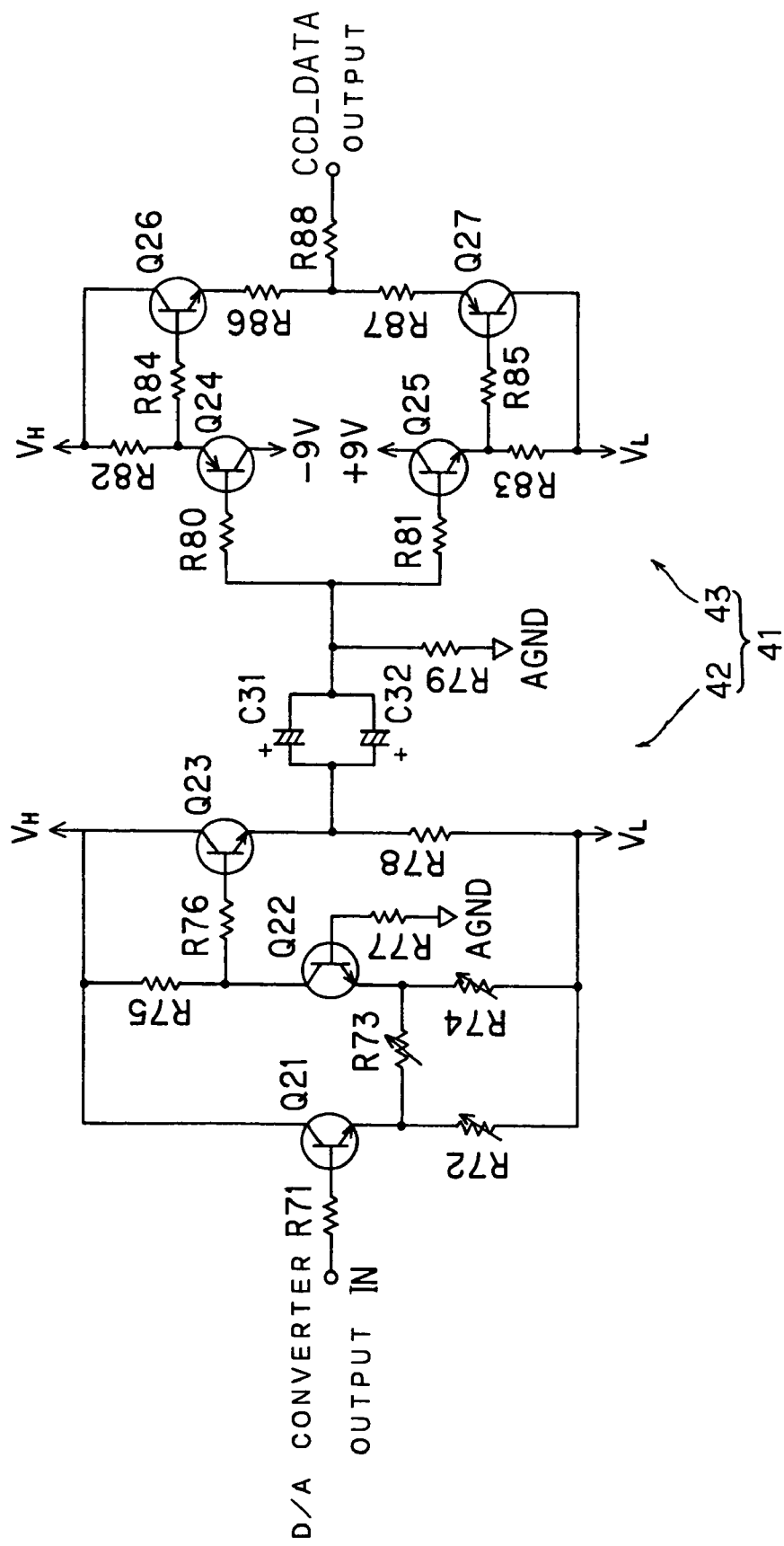

The digital-to-analog converter 17 converts digital data (of the memory 15) input from a signal (data) input terminal into analog data in response to application of the clock DACLK for the digital-to-analog conversion, and outputs the converted data (CCD_DATA) having a waveform W9 to the CCDout generating unit 14. Furthermore, the digital-to-analog converter 17 has a DATA pulse generating unit 41 for attenuating the digital-to-analog conversion output in the digital-to-analog converter and outputting the resulting data (CCD_DATA) to, the CCDout generating unit 14, as shown in FIG. 10 to be described later.

The CCDout generating unit 14 synthesizes both data having the waveform W9 and the reset pulse output from the reset-pulse generating unit 12, generates the CCDout having a waveform W10, and outputs the generated CCDout to a patient substrate 6A of the video processor 6.

In this way, the image-signal generating apparatus 1 generates the CCDout as the CCD output signal which is approximately equivalent to a signal applied to an actual CCD by synchronizing with the CCD driving pulse input to the image-signal generating apparatus 1 (from the video processor 6 as an inspection target), and outputs the CCDout to the patient substrate 6A of the video processor 6.

The video processor 6 performs adjustment of phase of the CDS pulse of the aforementioned (2) using the CCDout.

In this embodiment, the CCD driving pulse from (the patient substrate 6A of) the video processor 6 is also input to a driving pulse detecting unit 18, and the driving pulse detecting unit 18 detects whether CCD driving pulses are output from the video processor 6. When it is detected that the driving pulses are output normally, an LED 19 is turned on, and when it is not detected, the LED is turned off, thereby allowing it to be checked whether or not the driving pulses are output.

Figure 3:
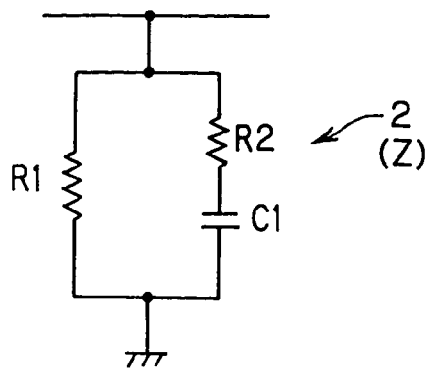

As the CCD-equivalent load circuit 2 in FIG. 2, the image-signal generating apparatus 1 is mounted with a load equivalent to various charge coupled devices such as a CCD-equivalent load circuit Z in which, for example, a resistor R1 and a serial circuit of a resistor R2 and a capacitor C1 are connected in parallel, basically as shown in FIG. 3.

Further, since the driving waveform observed by driving the CCD actually mounted on a head jig can be reconstructed, it is possible to surely perform the inspection (adjustment) of the aforementioned (1), that is, adjustment of a CCD driving pulse generating unit 8 (see FIG. 4A) for driving the CCD, without using the head jig actually mounted with the CCD or the CCD.

Here, the values of respective constants (impedance values) such as a resistance of the resistor R1, etc. of the CCD-equivalent load circuit Z shown in FIG. 3 correspond to a CCD which is a reference obtained by extracting, for example, a plurality of samples from different lots for each kind of CCD and averaging the extracted samples.

A method of inspecting the video processor 6 which is an inspection target of the image-signal generating apparatus 1 shown in FIG. 1 is shown in FIG. 4A, which illustrates an outline of the method compared with the first conventional example. Here, FIG. 4B corresponds to the inspection method according to the first conventional example.

As shown in FIG. 4A, the CCD driving pulse P (the waveform is indicated by a reference numeral 9) generated from the CCD driving pulse generating unit 8 provided in (the patient substrate 6A of) the video processor 6 is applied to the CCD-equivalent load circuit 2 of the image-signal generating apparatus 1 via a connection cable 5.

In the first conventional example, as shown in FIG. 4B, the CCD driving pulse P (the waveform of which is indicated by a reference numeral 9) generated from the CCD driving pulse generating unit 8 provided in (the patient substrate 6A of) the video processor 6 is applied to the CCD 81*a* of the head jig 85*a* via a connecting multi core cable 90 and, for example, a scope cable 83*a* to which the connecting multi core cable 90 is selectively connected.

Further, in the first conventional example, when the inspection by the CCD 81*a* of the head jig 85*a* is finished, the CCD pulse generating unit is connected to another head jig 85*b* and the inspection with the CCD 81*b* thereof is performed.

Furthermore, in a test signal generating apparatus according to the second conventional example not having the CCD-equivalent load circuit, since the condition is made to be different from the case of driving the actual CCD, the adjustment may not be performed with high accuracy.

On the contrary, in this embodiment, since the CCD-equivalent load circuit 2 which is approximately equivalent to the load of an actual CCD is constructed to generate the CCDout, the CCDout can be generated under the same condition as a case of driving the actual CCD even when the CCD driving signal is applied to the CCD-equivalent load circuit 2, so that it is possible to perform the adjustment with high accuracy.

Furthermore, in this embodiment, as a basic structure of the CCD-equivalent load circuit 2, the CCD-equivalent load circuit Z is shown in FIG. 3, but when the kind of CCD is changed, the value, thereof is changed. For this reason, in this embodiment, as shown in FIG. 5, the CCD-equivalent load circuit 2 basically comprises switches (or relays) 21*a*, 21*b* corresponding to the plural kinds of CODs and CCD-equivalent load circuits Z1, Z2, . . . , Zn which are equivalent to plural kinds of CODs.

In this way, by including the CCD-equivalent load circuits Z1, Z2, Zn which are equivalent to plural kinds of CCDs, any CCD-equivalent load circuit can be selected or switched from the CCD-equivalent load circuits Z1, Z2, . . . , Zn, thereby coping with CCDs of different kinds. Here, the CCD-equivalent load circuit Z1, etc. is set to be different in a value of the resistor R1, etc. from the CCD-equivalent load circuit Z of FIG. 3.

In this case, the switches (or relays) 21*a*, 21*b* can be switched by means of manual manipulation of a switching button (or a lever) 22. Further, in a second embodiment to be described later, the inspection can be performed automatically by a control signal from, for example, a personal computer (hereinafter, abbreviated as PC).

Figure 5:
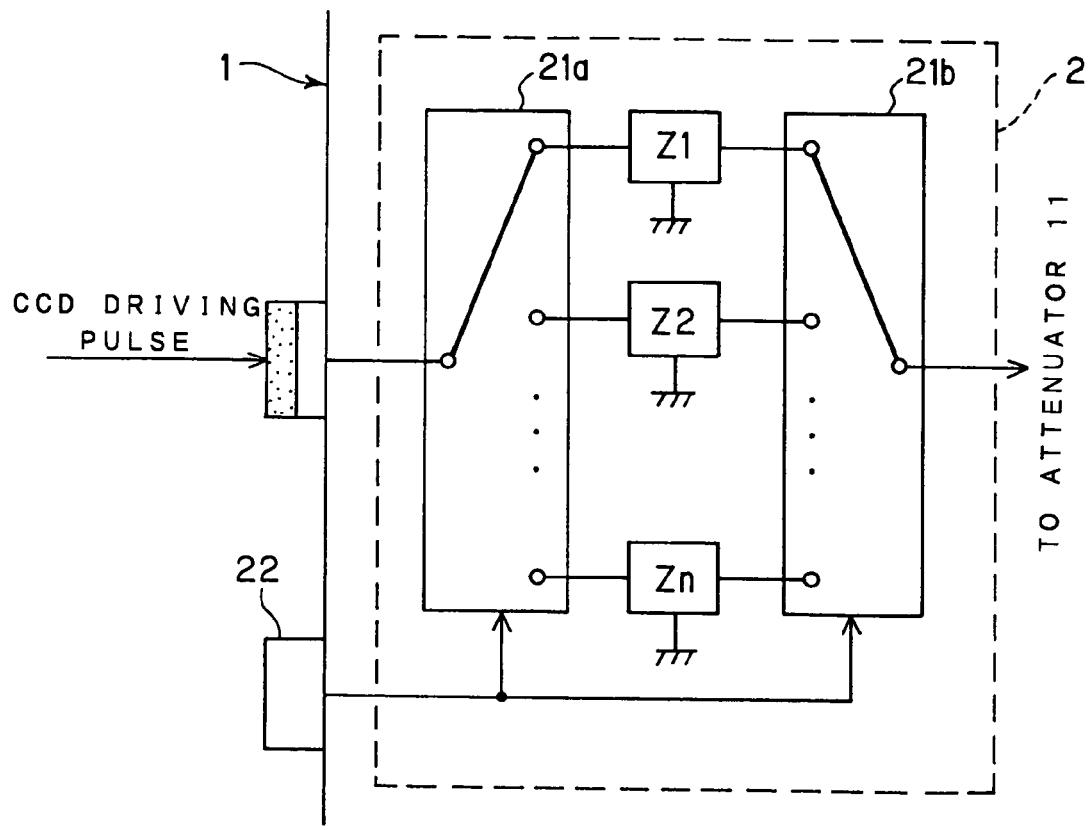
Figure 6:
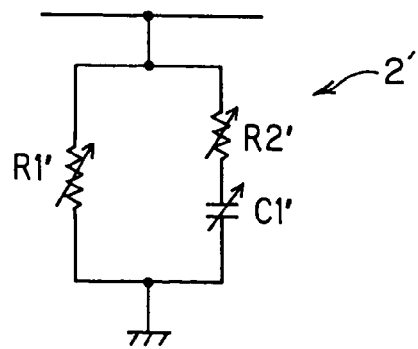

While the plurality of CCD-equivalent load circuit Z1, Z2, . . . , Zn are switched in FIG. 5, it is possible to realize plural kinds of CCD-equivalent load circuits by one circuit by forming the resistor R1', R2' and the capacitor C1' out of a variable resistor, a variable capacitor, etc. having variable constants as in the CCD-equivalent load circuit 2' shown in FIG. 6.

Further, the memory 15 of FIG. 2 includes ROM which stores data of plural charts such as white, color bar, gray scale, etc., and the data required for the inspection process can be output by switching a part of addresses by using a switch not shown.

Figure 7:
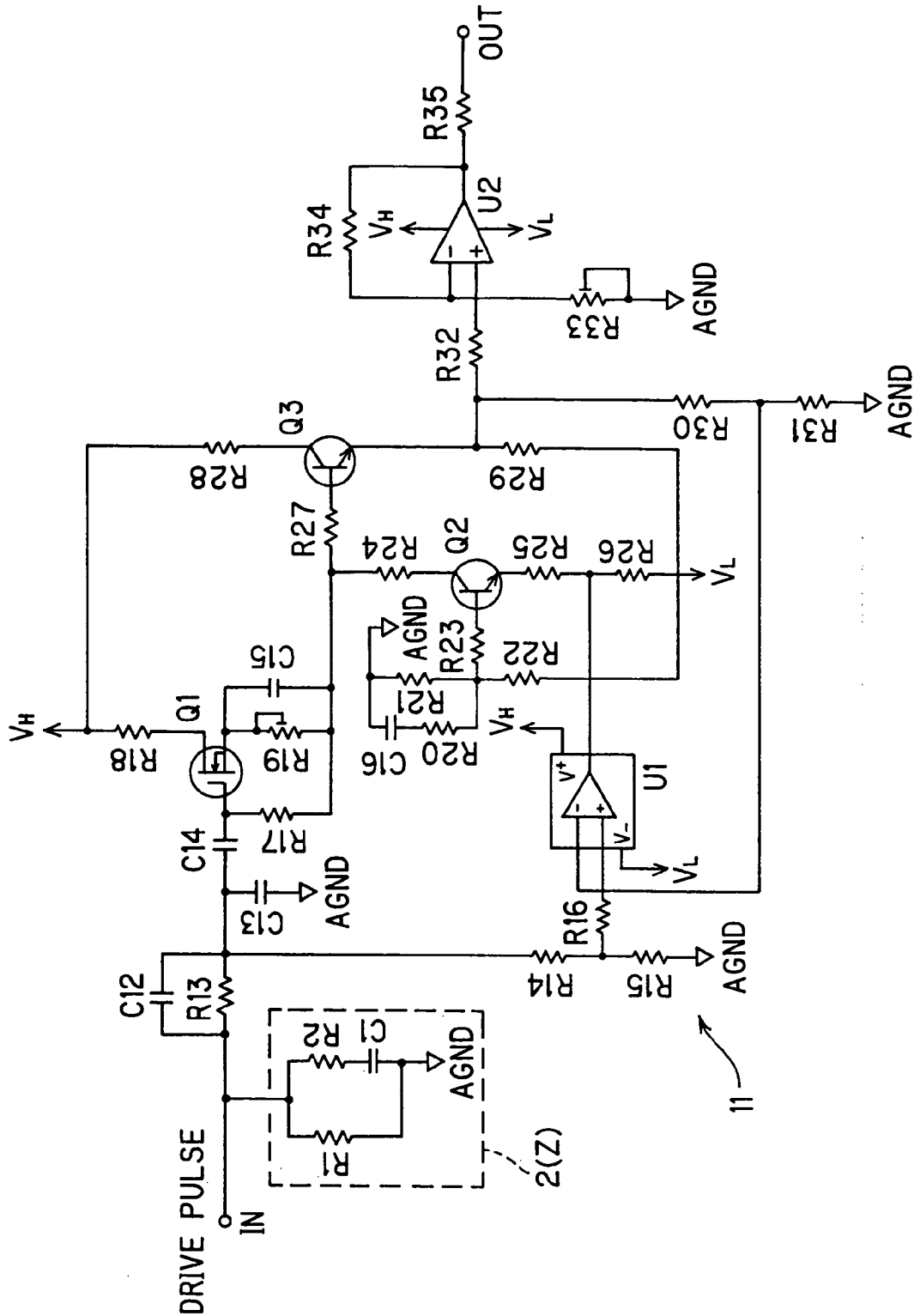
Figure 8:
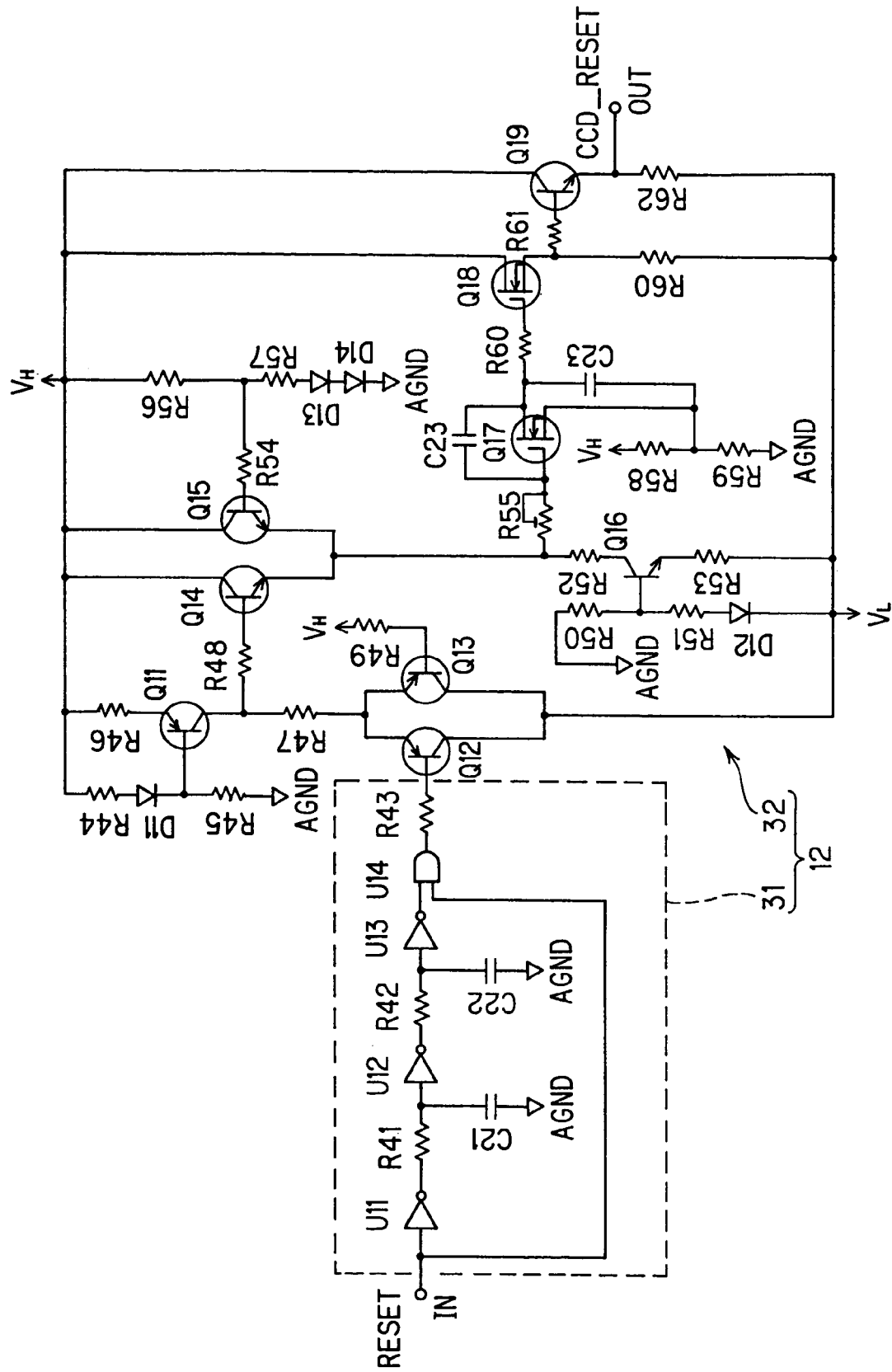
Figure 9:
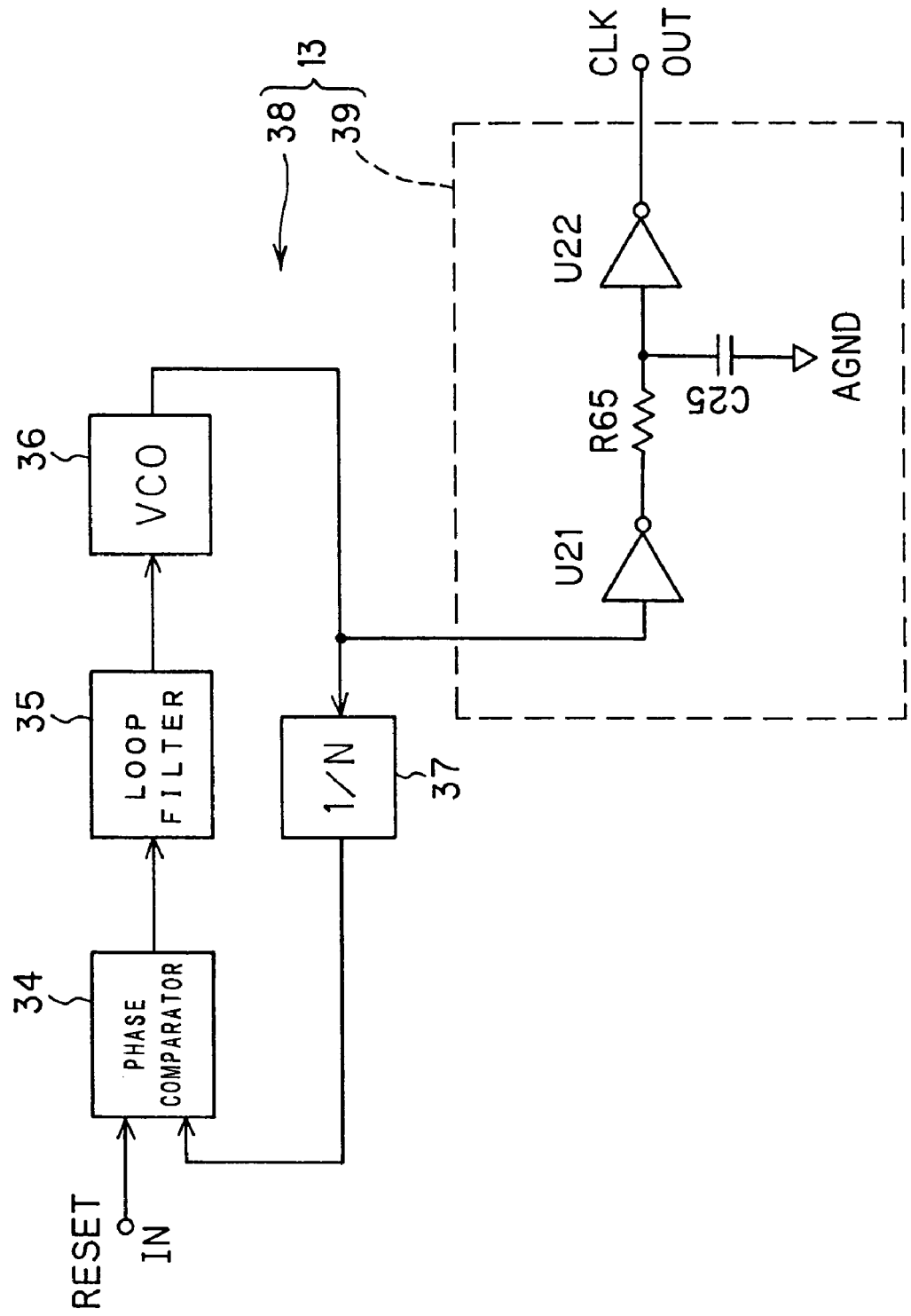
Figure 11:
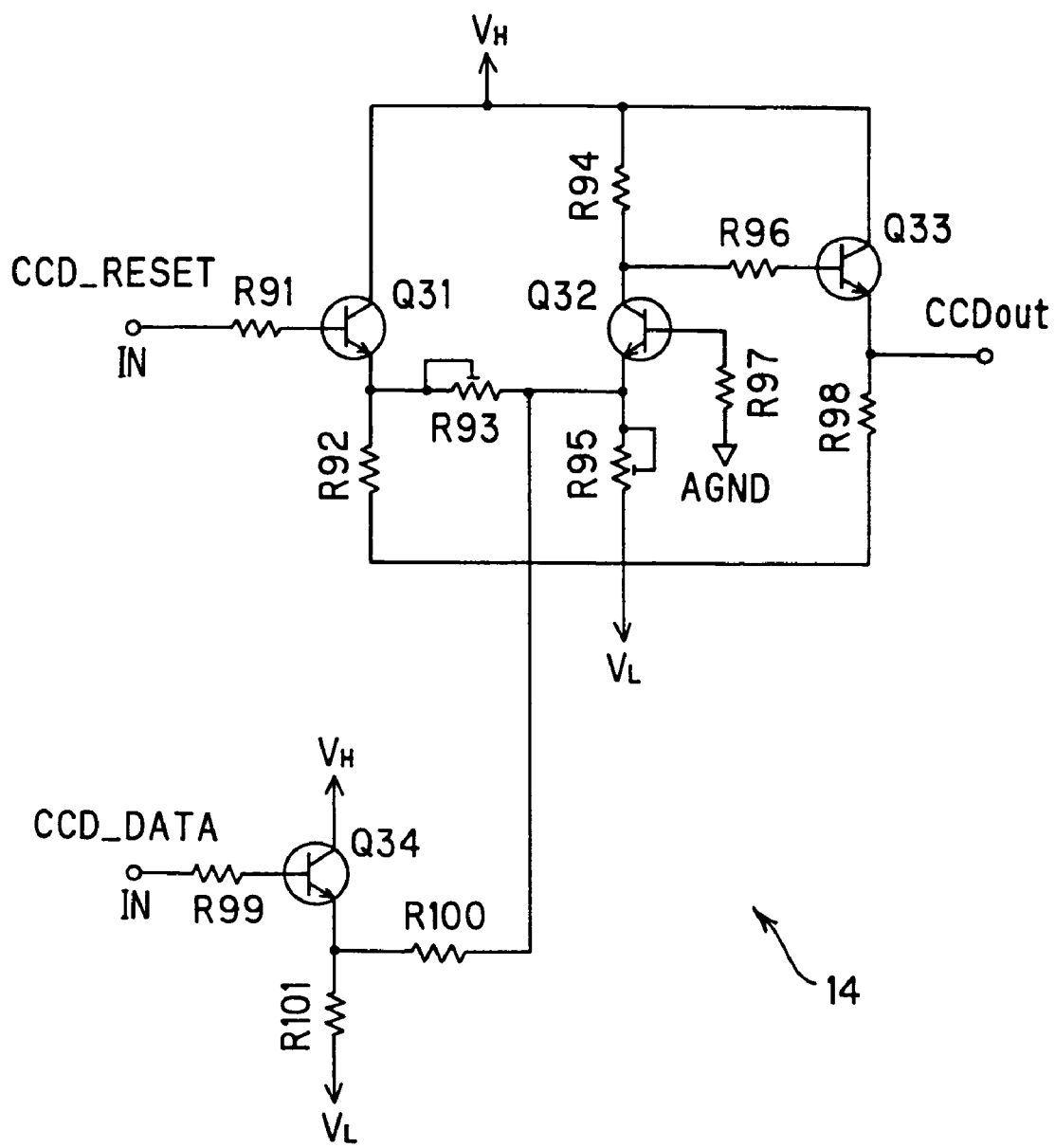

The specific structures of the CCD-equivalent load circuit 2 and the attenuator 11 shown in FIG. 2 is shown in FIG. 7, the specific structure of the reset-pulse generating unit 12 is shown in FIG. 8, the specific structure of the PLL/delay circuit 13 is shown in FIG. 9, the specific structure of the DATA pulse generating unit 41 at the output portion of the digital-to-analog converter 17 is shown in FIG. 10, and the specific structure of the CCDout generating unit 14 of FIG. 2 is shown in FIG. 11.

As shown in FIG. 7, a terminal to which the CCD driving pulse is applied is terminated at the CCD-equivalent load circuit 2 comprising resistors R1, R1 and a capacitor C1, and the terminal terminated at the CCD-equivalent load circuit 2 is connected to the attenuator 11.

The attenuator 11 shown in FIG. 7 comprises resistors R13 to R35, capacitors C12 to C16, transistors Q1 to Q3, and operational amplifiers U1, U2, and an attenuation rate can be set to be variable in accordance with the value of a variable resistor R33 in an attenuation rate adjusting unit comprising an operational amplifier U2, etc.

For the purpose of simplification, a structure of one attenuation rate adjusting unit for performing the output to the reset-pulse generating unit 12 (and the PLL/delay circuit 13) is shown in FIG. 7, and actually as shown in FIG. 2, an attenuation rate adjusting unit for outputting the output signal thereof to the oscilloscope 7 side and the reset-pulse generating unit 12 side is provided.

Further, in FIG. 7, as same in FIG. 3, a structure of the CCD-equivalent load circuit 2 having one CCD-equivalent load circuit Z is shown, but actually as shown in FIG. 5, the CCD-equivalent load circuit 2 comprises a plurality of CCD-equivalent load circuits Z1, Z2, . . . , Zn (which are constructed by changing the values of constants such as the value of the resistor R1, etc. in FIG. 3). Here, the CCD-equivalent load circuits Z1, Z2, . . . , Zn are set as a circuit which is a load equivalent to a CCD having a different kind.

The reset-pulse generating unit 12 shown in FIG. 8 comprises a pulse-width adjusting circuit 31 for extracting and outputting a pulse width of the output signal (abbreviated as RESET in FIG. 8) from the attenuator 11, and a reset-pulse generating circuit 32 for generating a reset pulse from the output pulse of the pulse-width adjusting circuit 31.

The pulse-width adjusting circuit 31 comprises inverter circuits U11 to U13, a logical product circuit (an AND circuit) U14, resistors R41 to R43, and capacitors C21, C22. Further, the reset-pulse generating circuit 32 comprises resistors R44 to R62, diodes D11 to D14, transistors Q1 to Q19, and a capacitor 23.

Therefore, the pulse width of the reset pulse is adjusted by the pulse-width adjusting circuit 31, and the level of the reset pulse is adjusted with the variable resistor R55 in the reset-pulse generating circuit 32.

The PLL/delay circuit 13 shown in FIG. 9 comprises a PLL (Phase Locked Loop) circuit 38 having a phase comparator 34 to which the output signal (abbreviated as RESET in FIG. 9) of the attenuator 11 is input, a loop filter 35 passing low frequency components of the output signal from the phase comparator 34, a voltage controlled oscillator 36 (abbreviated as VCO) for modifying and outputting the oscillation frequency in accordance with the level of the signal output from the loop filter 35, and a frequency divider circuit 37 for dividing the frequency of the output signal from the VCO 36 into 1/N (which is a division ratio for correcting a feature of voltage controlled oscillation of the VCO 36) and' inputting the frequency-divided signal to the phase comparator 34, and a delay circuit 39 for performing the time delay to the output signal of the VCO 36.

The delay circuit 39 comprises an inverter circuit U21 and U22, a resistor R65, and a capacitor C25.

As shown in FIG. 10, the DATA pulse generating unit 41 to which the output signal from the digital-to-analog converter 10 is input comprises an attenuator section 42 for attenuating the input signal into approximately ⅒ and a buffer section 43 provided at the next stage of the attenuator section 42.

The attenuator section 42 includes resistors R71 to R78 and transistors Q21 to Q23, and the buffer section 43 includes capacitors C31, C32, resistors R79 to R88, and transistors Q24 to Q27. The output signal CCD_DATA of the DATA pulse generating unit 41 is input to the CCDout generating unit 14.

The CCDout generating unit 14 shown in FIG. 11 synthesizes and outputs the output signal CCD_RESET from the reset-pulse generating unit 12 and the output signal CCD_DATA from the DATA pulse generating unit 41.

The CCDout generating unit 14 comprises resistors R91 to R101 and transistors Q31 to Q34. By varying the resistance values of the variable resistors R93 and R95, the signal level (amplitude) of the CCDout can be varied.

Although it has been described above that the video processor 6 corresponds to a plurality of CCDs, since the CCDs are mounted on various endoscopes, respectively, and the shapes or lengths thereof are different depending upon the purpose of use, the cables for transmitting image signals output from the CCDs are different depending upon the endoscopes to be mounted thereon.

Therefore, if observing the image signal output from the CCD from the board side of the video processor 6 as an inspection target using an oscilloscope, etc., the propagation delay time is different depending upon the CCDs.

In this way, since the delay time is different depending upon the CCDs, the delay times of the input signals input to the video processor 6 from a head jig (A) 85*a* and a head jig (B) 85*b* when the head jig (A) 85*a* and the head jig (B) 85*b* different from each other are used as shown in FIG. 4B are different mainly depending upon the lengths of the scope cables 83*a* and 83*b* in the head jig (A) 85*a* and the head jig (B) 85*b*.

In order to cope with this case, the image-signal generating apparatus 1 is set to output the image signal correspondingly to the endoscopes (or television cameras) mounted with various CCDs such that a predetermined delay time is generated even when the image signal output from the image-signal generating apparatus 1 according to the first embodiment is observed from the video processor 6 side.

Figure 12:
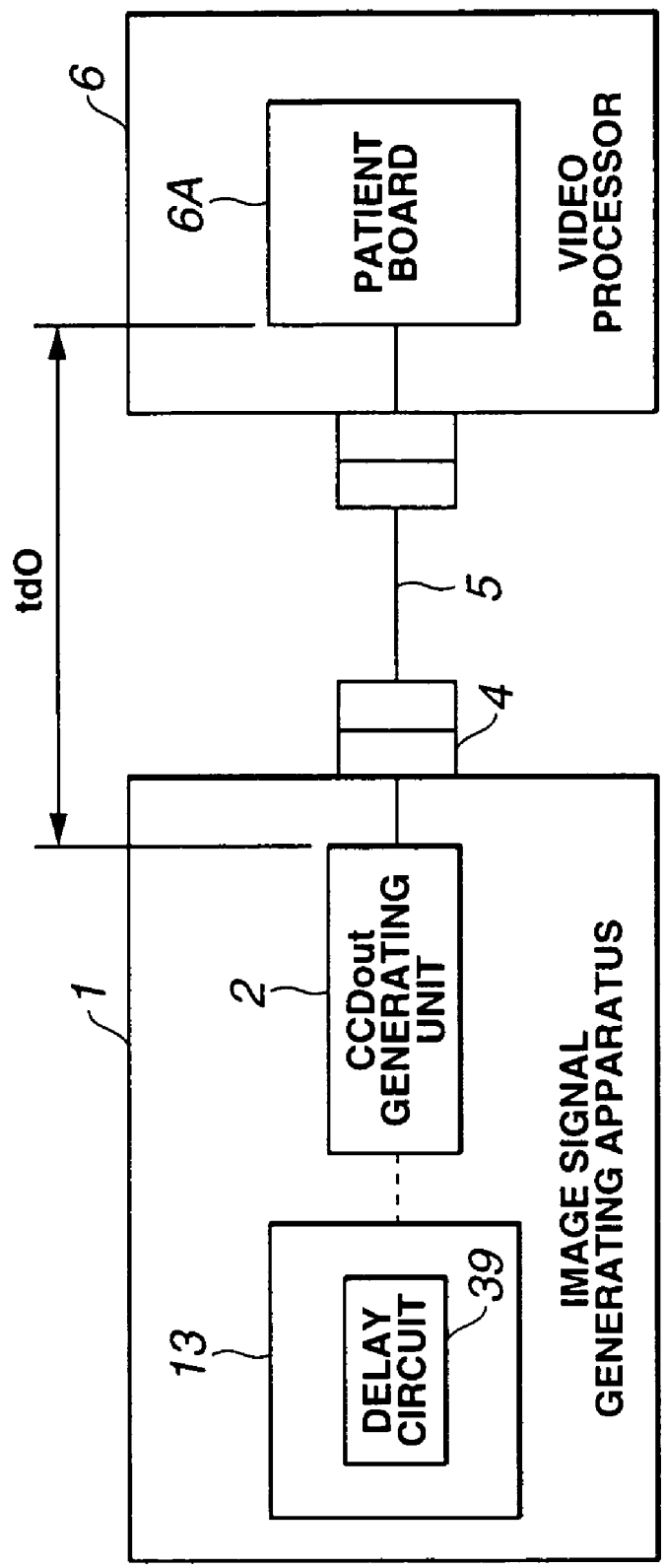

That is, in the image-signal generating apparatus 1, a delay circuit 39 having a delay amount corresponding to the delay time due to the scope cables 83*a*, 83*b* of FIG. 4B is provided in the PLL/delay circuit 13, as shown in FIG. 12. Further, a structure including the delay circuit 39 is shown in FIG. 9.

Figure 13:
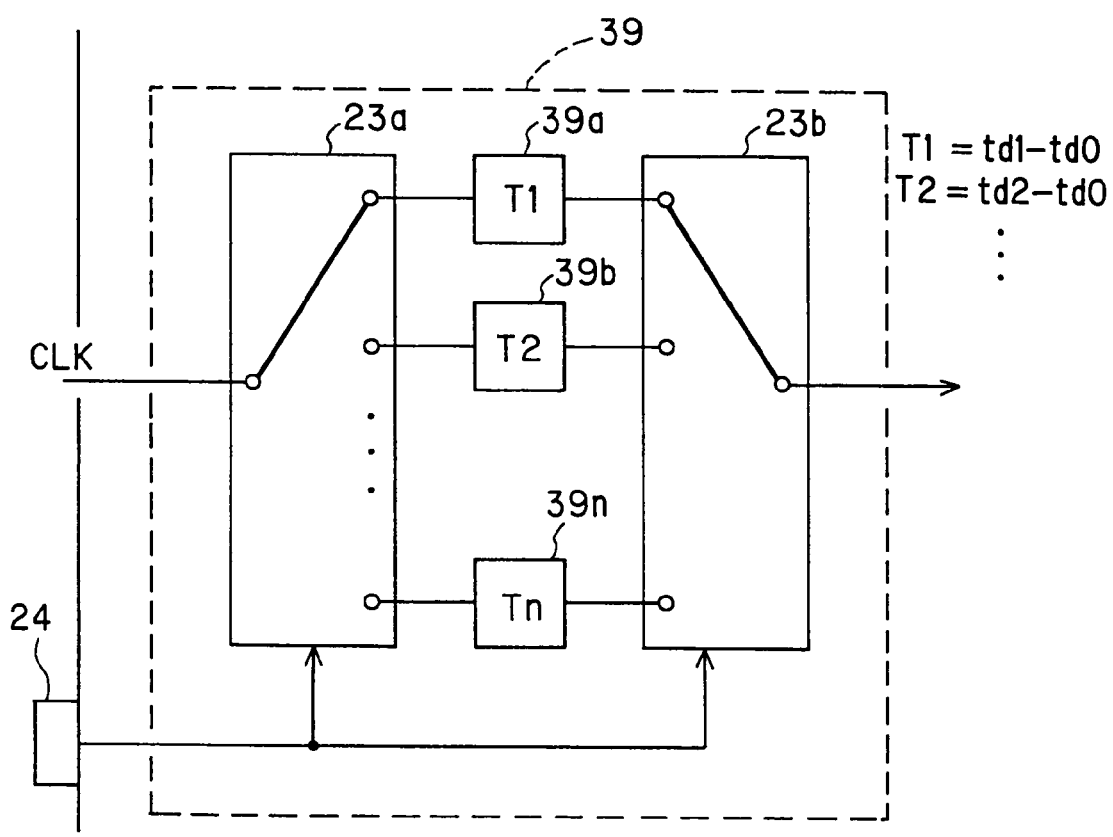

As shown in FIG. 13, the delay circuit 39 can be switched, actually, using delay circuits 39*a*, 39*b*, . . . , 39*n* set to have different delay amounts T1, T2, . . . , Tn.

That is, as shown in FIG. 13, the delay circuit 39 comprises switches (or relays) 23*a*, 23*b*, delay circuits 39*a*, 39*b*, . . . , 39*n* having the different delay amounts, and a switching button (or lever) 24 for switching the switches 23*a*, 23*b* in communication therewith.

As shown in FIG. 12, when the delay amount due to the connection cable 5, etc. is td0 and the delay circuit 39*a* is selected, the total delay amount including the delay amount td0 due to the connection cable 5, etc. is set to td1. That is, the delay amount T1 is set to be T1=td1−td0, and the delay amount T2 is similarly set to be T2=td2−td0.

Figure 25:
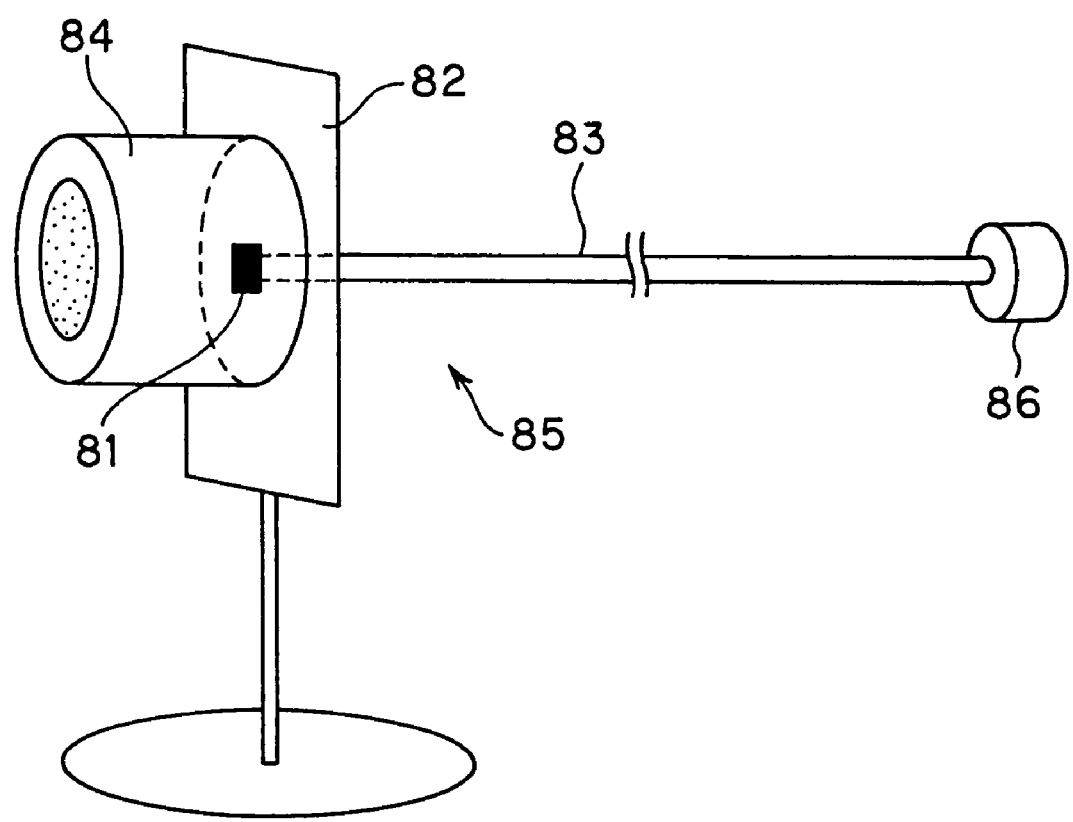
FIG. 25 is a diagram illustrating a head jig used for inspection and adjustment of a video processor in the conventional examples.

In this way, the delay time of signals mainly depending upon the length of the scope cable 83 shown in FIG. 25 is equivalently realized by using switchably a plurality of delay circuit 39a, 39b, etc. provided in the delay circuit 39.

Figure 14:
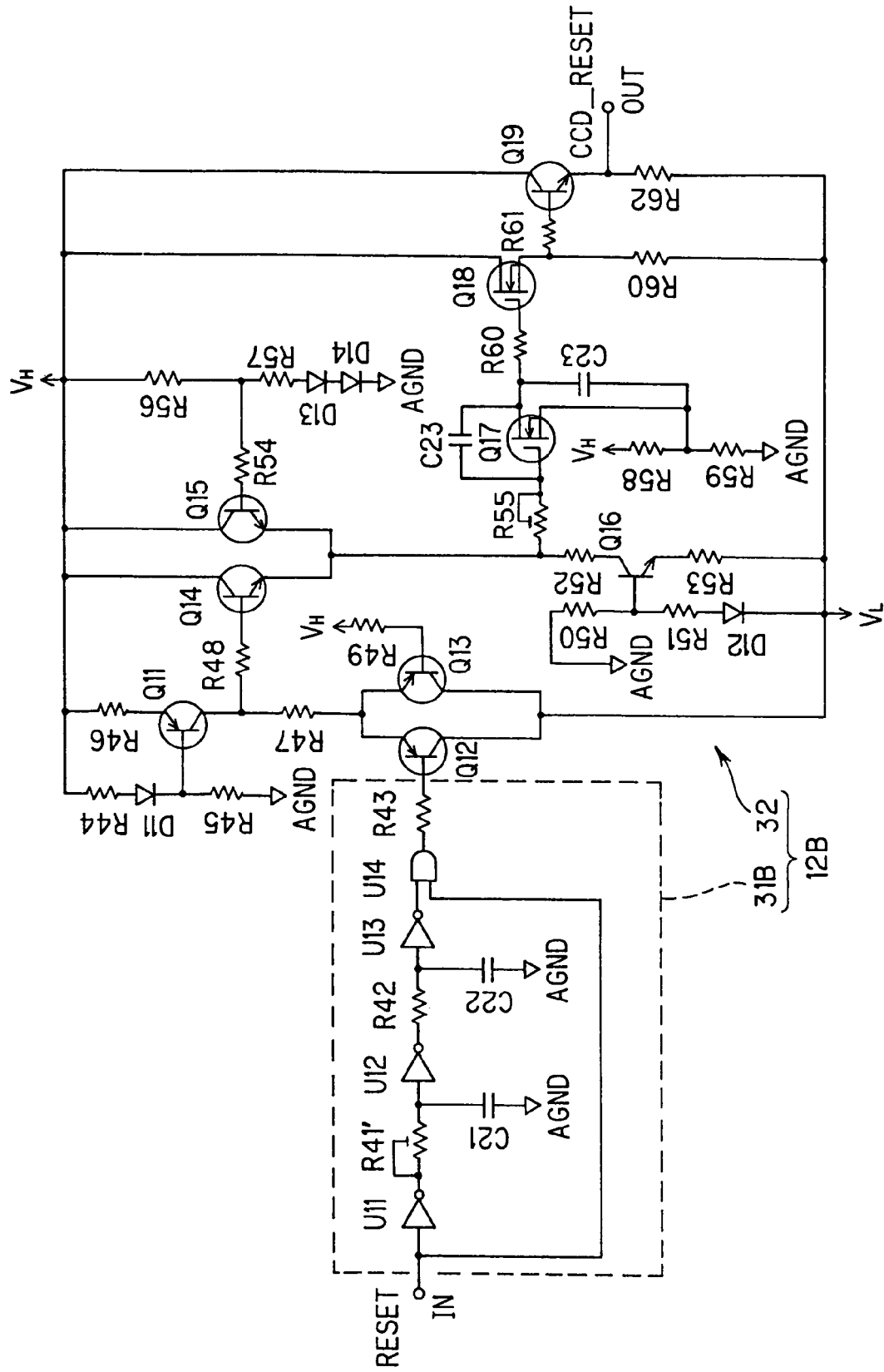

The pulse-width adjusting circuit 31 in the reset-pulse generating unit 12 shown in FIG. 8 may be constructed as a pulse-width adjusting circuit 31B for adjusting the pulse width of the reset pulse, for example, using a variable resistor R41' whose resistance value is set variably in place of the resistor R41 as in the reset-pulse generating unit 12B shown in FIG. 14.

The reset-pulse generating unit 12B of FIG. 14 has the same structure as that of FIG. 8, except for the variable resistor R41'.

In this way, the pulse width of the reset pulse can be variably set.

Figure 15:
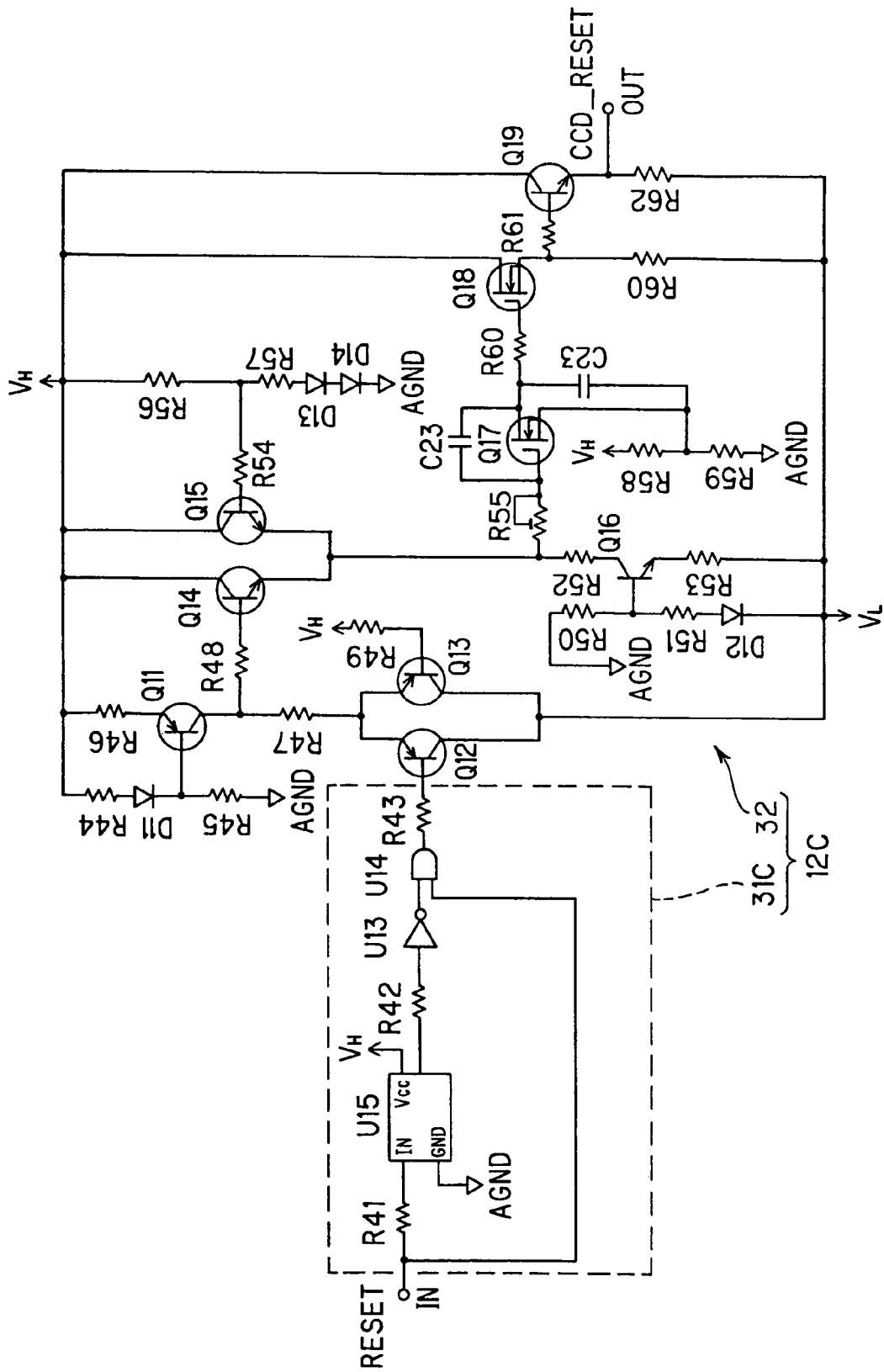

As the reset-pulse generating unit 12C shown in FIG. 15, the pulse width of the reset pulse may be adjusted, for example, using a delay line U15 for the pulse-width adjusting circuit 31C.

In the first embodiment, as described hereinafter, by providing the CCD-equivalent load circuit 2 (as a solid-state image pickup device-equivalent load circuit) which is a load equivalent to the solid-state image pickup device (specifically, CCD) and the image-signal generating circuit 3 for generating the CCD output signal (image signal) which is approximately equivalent to the CCD output signal (image signal) output from the actual CCD in synchronism with the driving signal when the driving signal for driving the CCD is applied from the video processor 6 as an inspection target, it is possible to perform the inspection and adjustment of the video processor 6 as an inspection target without using the head jig actually mounted with the CCD.

Next, operation of the first embodiment will be described with reference to FIGS. 1, 2, etc. First, as shown in FIG. 1, the video processor 6 as an inspection target is connected to the image-signal generating apparatus 1 according to the first embodiment, so that the waveforms of the respective elements in the patient board 6A of the video processor 6 can be observed using the oscilloscope 7. Then, the image-signal generating apparatus 1 and the video processor 6 are turned on, thereby starting the inspection.

Various CCD driving pulses are input to the image-signal generating apparatus 1 from the patient board 6A of the video processor 6. As shown in FIG. 7, the input signal is terminated at the CCD-equivalent load circuit 2. As shown in the waveform W3 of FIG. 2, since it is difficult for a next-stage block to process the CCD driving pulses (waveforms W1, W2) having a large amplitude, the driving pulses are attenuated into 5 Vpp by the attenuator 11.

The horizontal transfer pulse φS of the CCD driving pulses attenuated by the attenuator 11 is input to the reset-pulse generating unit 12. Here, a pulse having a predetermined pulse width is cut out and a pulse CCD_RESET obtained by further attenuating the pulse is output (the pulse width and amplitude are variable as shown in FIG. 8).

The horizontal transfer pulse φS is also input to the PLL/delay circuit 13. Here, a reference clock CLK synchronized with the horizontal transfer pulse φS is generated, is made to have a predetermined delay amount via the aforementioned delay circuit 39 (for example, shown in FIG. 9), and is then output to another block.

In the memory 15 operating on the basis of the clock CLK, data of various charts are stored, and the data of the designated chart are output therefrom.

The clock CLK is input to the DACLK generating unit 16, and the DACLK generating unit 16 adjusts the phase and pulse width of the clock CLK and generates a reference clock DACLK which is used for the digital-to-analog converter 17.

The digital-to-analog converter 17 digital-to-analog converts data of a chart obtained from the memory 15 on the basis of the reference clock DACLK, and the DATA pulse generating unit 41 shown in FIG. 10 outputs the pulse CCD_DATA obtained by attenuating the data. (The amplitude of the pulse is variable, and by varying the pulse width of DACLK, the pulse width of CCD_DATA may be varied.)

The CCDout generating unit 14 synthesizes the pulse CCD_RESET obtained from the reset-pulse generating unit 12 and the pulse CCD_DATA obtained from (the DATA pulse generating unit 41 at the output portion of) the digital-to-analog converter 17, and outputs the synthesized pulse as an image signal of CCDout (here, the total gain of CCDout is variable).

In the first embodiment, since the CCD-equivalent load circuit 2 which is equivalent to a plurality of CCDs can be realized by performing the switching as shown in FIG. 5, it is possible to perform the inspection of different kinds of CCDs only by simple switching operation. That is, it is possible to perform the adjustment such as the adjustment of the CCD driving pulse generating circuit 8, etc. in the video processor 6 or the phase adjustment of the CDS pulse with high accuracy and with small deviation, without using the head jig 85, etc. in the conventional example.

As for the adjustment of the pulse width and amplitude of the CCD driving pulse or the adjustment of the phase and amplitude of the CDS pulse, manual adjustment is performed while observing the waveforms thereof using the oscilloscope 7, in place of an automatic adjustment operation to be described in detail in a second embodiment.

Further, even when the CCD is mounted on another electronic endoscope having a different length of the inserting unit or a different scope cable, since the delay circuit 39 shown in FIG. 13, which can vary the delay amount, is provided in the PLL/delay circuit 13, the video processor 6 capable of coping with the CCD mounted on an endoscope having a different length of the inserting unit, etc. can be subjected to the inspection and adjustment by means of the switching manipulation.

Figure 16A:
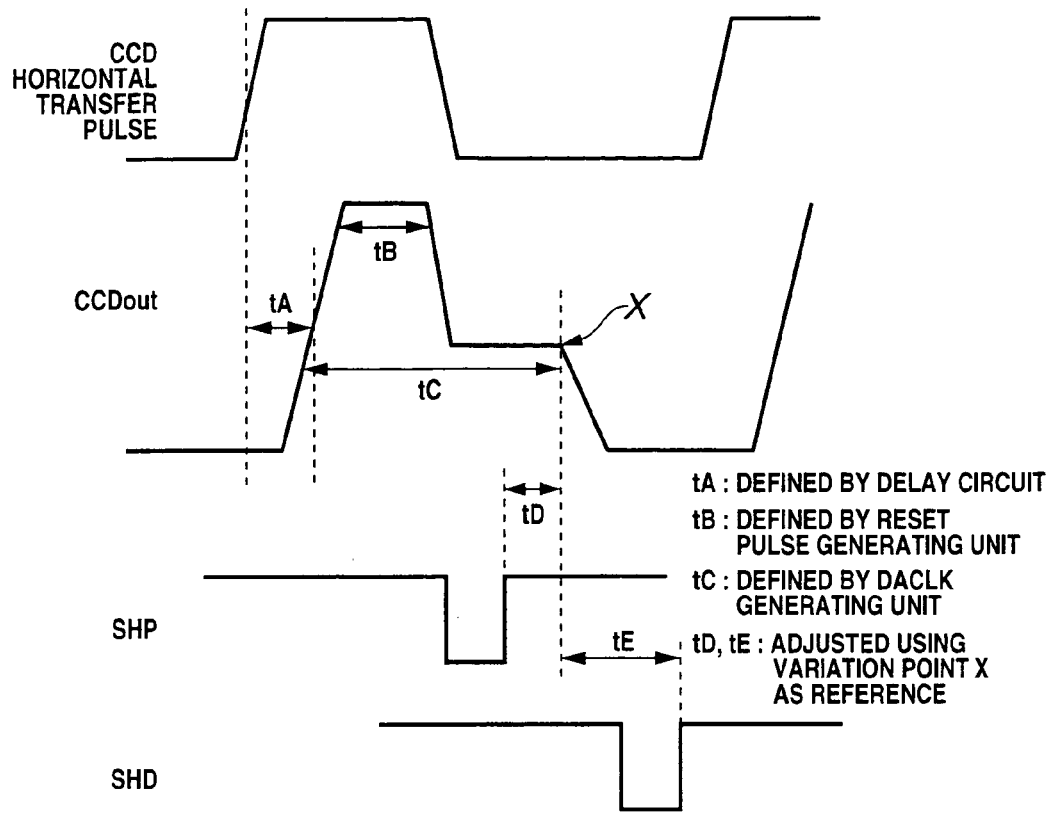
Figure 16B:
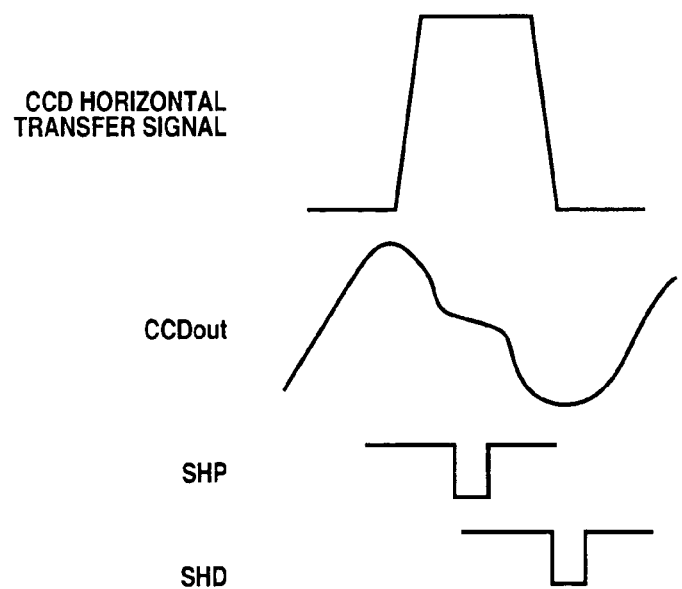
FIG. 16B is an explanatory diagram illustrating an output waveform of CCDout in the first conventional example and a state where a phase of the CDS pulse is adjusted using the output waveform.

Additionally, for example, the CCD horizontal transfer pulse, the CCDout, and the CDS sampling pulses SHP, SHD during the CDS adjustment according to the first embodiment are as shown in FIG. 16A, and the first conventional example corresponding thereto is as shown in FIG. 16B. Specifically, the waveforms of CCDout in FIGS. 16A and 16B are different from each other.

When the image-signal generating apparatus 1 is used, as shown in FIG. 16A, the image output waveform having small distortion is employed, where the boundaries between the reset portion, the feed-through portion, and the data portion in the waveform of CCDout are clear.

In this way, since the boundary positions among the reset portion, etc % are clear, based on a delay time to delayed by the delay circuit from the rising of the CCD horizontal transfer pulse to the falling of the CCDout, a time tB defined by the reset-pulse generating unit 12, the pulse width tC defined by the DACLK generating unit 16, and times tD, tE set using the variation point X of the feed-through portion and the data portion as a reference, the sampling signals SHP, SHD are adjusted easily with high accuracy.

On the contrary, in the conventional example, as shown in FIG. 16B, since the waveform of the CCDout is rounded to thereby have large distortion and the boundaries between the reset portion, the feed-through portion, and the data portion are not surely identified, it is difficult to adjust the sampling signals SHP, SHD and to accurately set them. Further, the respective deviations are increased.

In the inspection using the conventional head jig 85, etc., it is necessary to pay the most possible attention to prevent the CCD 81 from being destroyed, so that the maintenance thereof is very difficult. However, since the image-signal generating apparatus 1 is not mounted with the CCD, the maintenance thereof is easy compared with the conventional example.

Further, the image-signal generating apparatus 1 allows the plural apparatuses to be relatively simply manufactured. On the contrary, in the inspection using the conventional head jig 85, since it is necessary to perform the adjustment using one CCD as a reference and the respective CCDs have deviation in characteristics, only one inspection line could be prepared.

On the contrary, according to the first embodiment, a plurality of image-signal generating apparatuses 1 can be used and thus the number of inspection lines can be increased, thereby improving the production efficiency.

Further, since the inspection system employing the image-signal generating apparatus 1 does not include non-determined factors having deviations such as a load due to the CCD or a cable in the conventional examples, it is possible to perform the adjustment and inspection of the board of the video processor 6 in a system having traceability by periodically correcting the image-signal generating apparatus 1. For this reason, the deviation in adjustment of the board can be extremely suppressed.

Therefore, the first embodiment has the following advantages.

By employing the image-signal generating apparatus 1, it is possible to simply perform the adjustment of the elements relating to the CCD in the video processor 6 as an inspection target (adjustment target), specifically the adjustment of the CCD driving pulse generating circuit 8 or the phase adjustment of the CDS pulse, without using the head jig 85, etc.

Since the image-signal generating apparatus 1 is mounted with plural kinds of CCD-equivalent load circuits, it is possible to simply perform the inspection and adjustment corresponding to the plural kinds of CCDs using only the image-signal generating apparatus 1, without using plural kinds of head jigs. That is, although troublesome works such as attachment and detachment of a connector or replacement of a chart are required in the conventional example, the work of switching the switch is sufficient, thereby more simply performing the inspection and adjustment.

When the image signal output from the image-signal generating apparatus 1 is observed on the patient board 6A side, the image signal can be output in a waveform having small distortion compared with the conventional example. As a result, it is possible to easily perform the phase adjustment of the CDS pulse, to decrease the deviation in adjustment, and thus to perform the adjustment with high accuracy.

Further, compared with the inspection using the conventional head jig 85, etc., the maintenance thereof is easy.

Furthermore, the image-signal generating apparatus 1 allows the plural apparatuses to be relatively simply manufactured.

By correcting the image-signal generating apparatus 1 in comparison with the conventional example, the inspection can be performed in a state where the traceability is taken, so that it is possible to extremely suppress the deviation in adjustment of the patient substrate 6A of the video processor 6.

Second Embodiment

Figure 17:
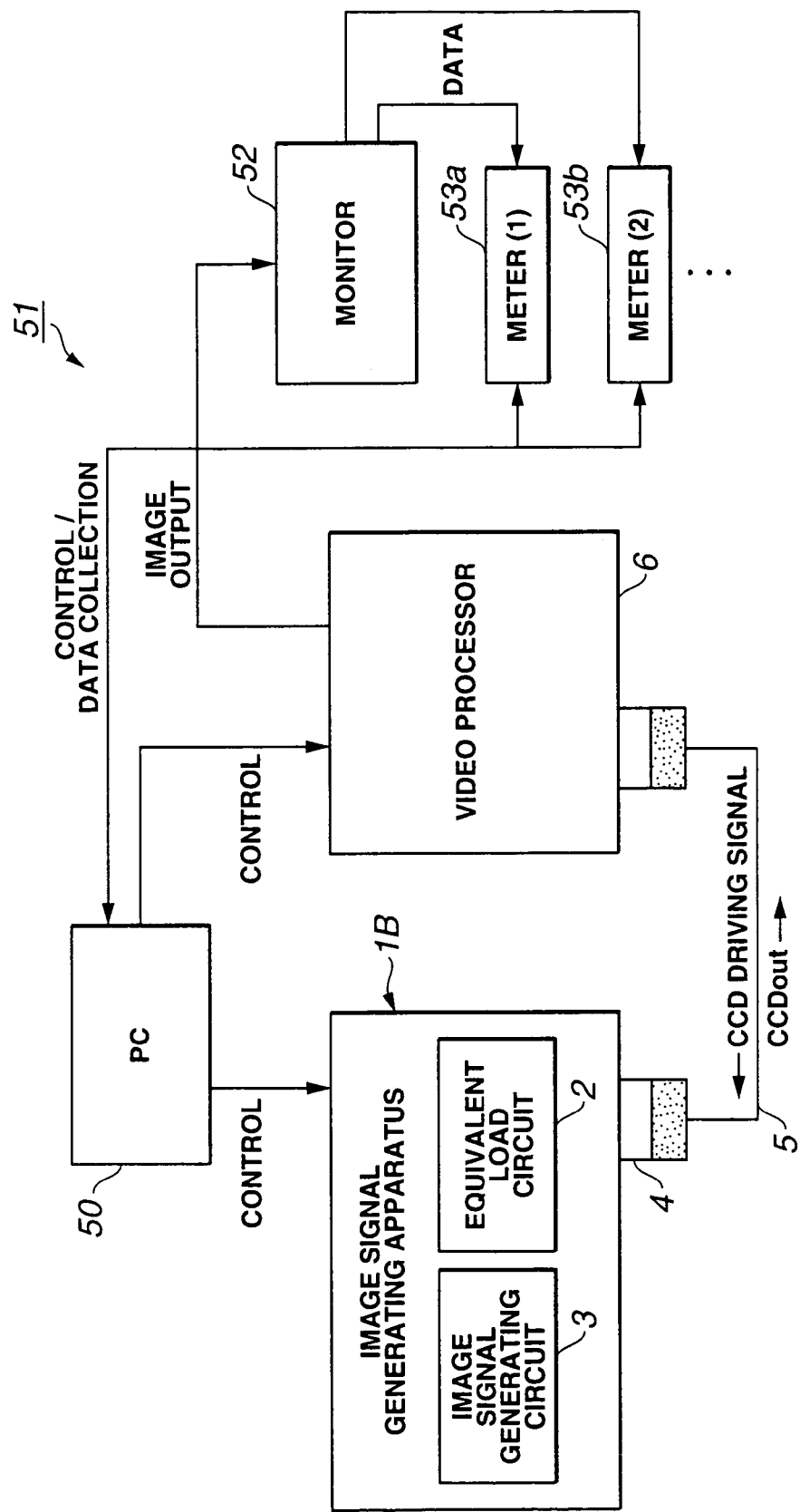

Next, an image-signal generating apparatus according to a second embodiment will be described with reference to FIGS. 17 to 22. FIG. 17 shows a structure of the image-signal generating apparatus 1B according to the second embodiment. In the second embodiment, an inspection system 51, which can more simply perform the inspection and adjustment of the video processor 6 as an inspection target using, for example, a personal computer (abbreviated as PC in FIG. 7, etc.) 50 as a control unit for performing control, is provided.

In the second embodiment, similarly to FIG. 1, the image-signal generating apparatus 1B is connected to the video processor 6 as an inspection target through the connection cable 5 to which the connector 4 is connected. The image output terminal of the video processor 6 is connected to a monitor 52, and the monitor 52 is connected to a meter (1) 53*a*, a meter (2) 53*b*, . . . for performing measurement.

Further, in the second embodiment, the image-signal generating apparatus 1B and the video processor 6 are connected to the PC 50 for controlling them, the meter (1) 53*a*, the meter (2) 53*b*, . . . are connected to the PC 50, and the PC 50 also performs the data collection of the result data measured by the meter (1) 53*a*, the meter (2) 53*b*, . . . or the control of the meter (1) 53*a*, the meter (2) 53*b*, . . . .

Figure 18:
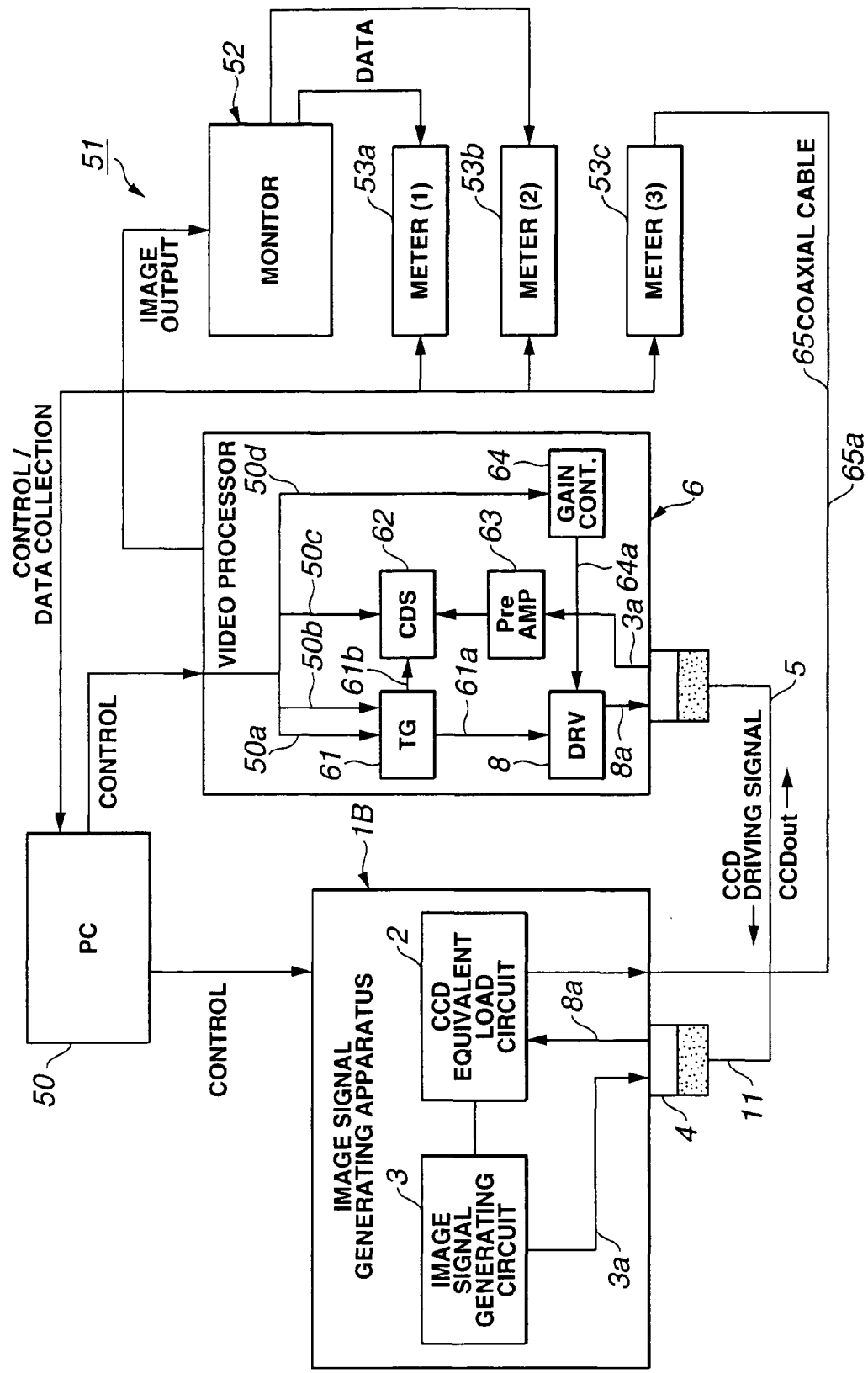

FIG. 18 shows more specifically a structure of FIG. 17.

The video processor 6 outputs a driving pulse generating clock 61*a*, in which the pulse width generated by a timing generator (abbreviated as TG) 61 is adjusted, to the driving pulse generating unit 8, and the TG 61 outputs the CDS pulse 61*b* of which a phase has been adjusted to the CDS circuit 62.

A signal is input to the CDS circuit 62 via a pre-amplifier 63 for amplifying the CCDout output from the CCD-equivalent load circuit 2.

In the video processor 6, a gain control circuit 64 for outputting a signal 64*a* for controlling a source voltage of the driving pulse generating unit 8 is provided.

The PC 50 outputs control signals for controlling the TG 61, the CDS circuit 62, and the gain control circuit 64 in the video processor 6.

That is, the PC 50 outputs a driving pulse width control signal 50*a* and a CDS pulse phase control signal 50*b* to the TG 61. Further, the PC 50 outputs a CDS gain control signal 50*c* to the CDS circuit 62. Furthermore, the PC 50 outputs a driving pulse gain control signal 50*d* to the gain control circuit 64.

The driving pulse generating unit 8 in the video processor 6 applies a CCD driving pulse 8*a* to the CCD-equivalent load circuit 2 of the image-signal generating apparatus 1B via the connection cable 5. The CCD driving pulse 8*a* applied to the CCD-equivalent load circuit 2 becomes an output signal of CCDout via the image-signal generating circuit 3, and is input to the pre-amplifier 63 of the video processor 6 via the connection cable 5.

The CCD driving pulse 8*a* applied to the CCD-equivalent load circuit 2 becomes a CCD driving pulse 65*a* attenuated by a coaxial cable 65 and is input to a meter (3) 53*c*, and the CCD driving pulse 65*a* is measured. The meter (3) 53*c*, the meter (1) 53*a*, the meter (2) 53*b* are connected to the PC 50, controlled, and transmit the collected data to the PC 50.

The CDS pulse 61*b* output to the CDS circuit 62 from the TG 61 is input, for example, to the meter (3) 53*c* having a channel switching function for the input signal and the output signal, and the measured data thereof are transmitted to the PC 50. The signal output from the CDS circuit 62 is input to the meter (3) 53c having a channel switching function for the input signal and the output signal, and the measured data thereof are transmitted to the PC 50.

In this case, a meter (4) not shown in place of the meter (3) 53c may perform the measurement, and the data measured by the meter (4) may be transmitted to the PC 50.

Further, the PC 50 is connected to the image-signal generating apparatus 1B, and performs the control of the switching of the CCD-equivalent load circuit 2 or the switching of the image-signal generating circuit 3 in the image-signal generating apparatus 1B.

Figure 19:
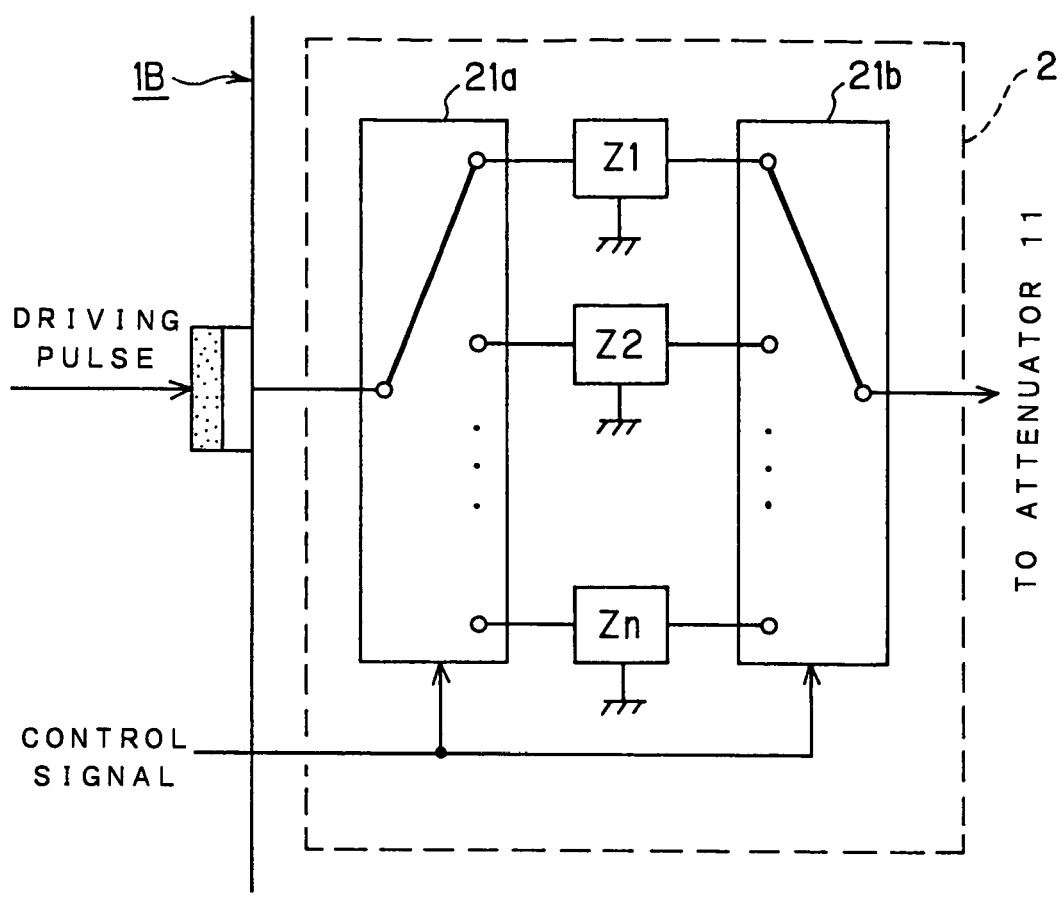

For example, although the switches 21a, 21b connected to a plurality of CCD-equivalent load circuits Z1, Z2, . . . Zn are manually switched in FIG. 5, as shown in FIG. 19, the switches are switched by the control signals from the PC 50 in the second embodiment. That is, the switches 21a, 21b are switched by the control signals in place of the switching button 22.

Furthermore, as shown in FIG. 6, by forming the variable resistor R1' out of an electronic volume and setting the resistance value to be variable by the control signals from the PC 50, the load circuits equivalent to the plural kinds of CCDs may be realized. Furthermore, the capacitor C1' is formed out of, for example, a capacity-variable diode, and the capacity value of the capacity-variable diode is set to be variable by the control signals from the PC 50.

The delay circuits 39a, 39b, . . . , 39n shown in FIG. 13 are switched by the control signals from the PC 50, similarly. In this case, since this modification is almost similar to the modification of FIG. 19 with respect to FIG. 5, it is not shown, and instead, the PLL/delay circuit 13B in which the delay circuits 39 of the PLL/delay circuit 13 of FIG. 9 can be controlled by the control signals is shown in FIG. 20.

Figure 20:
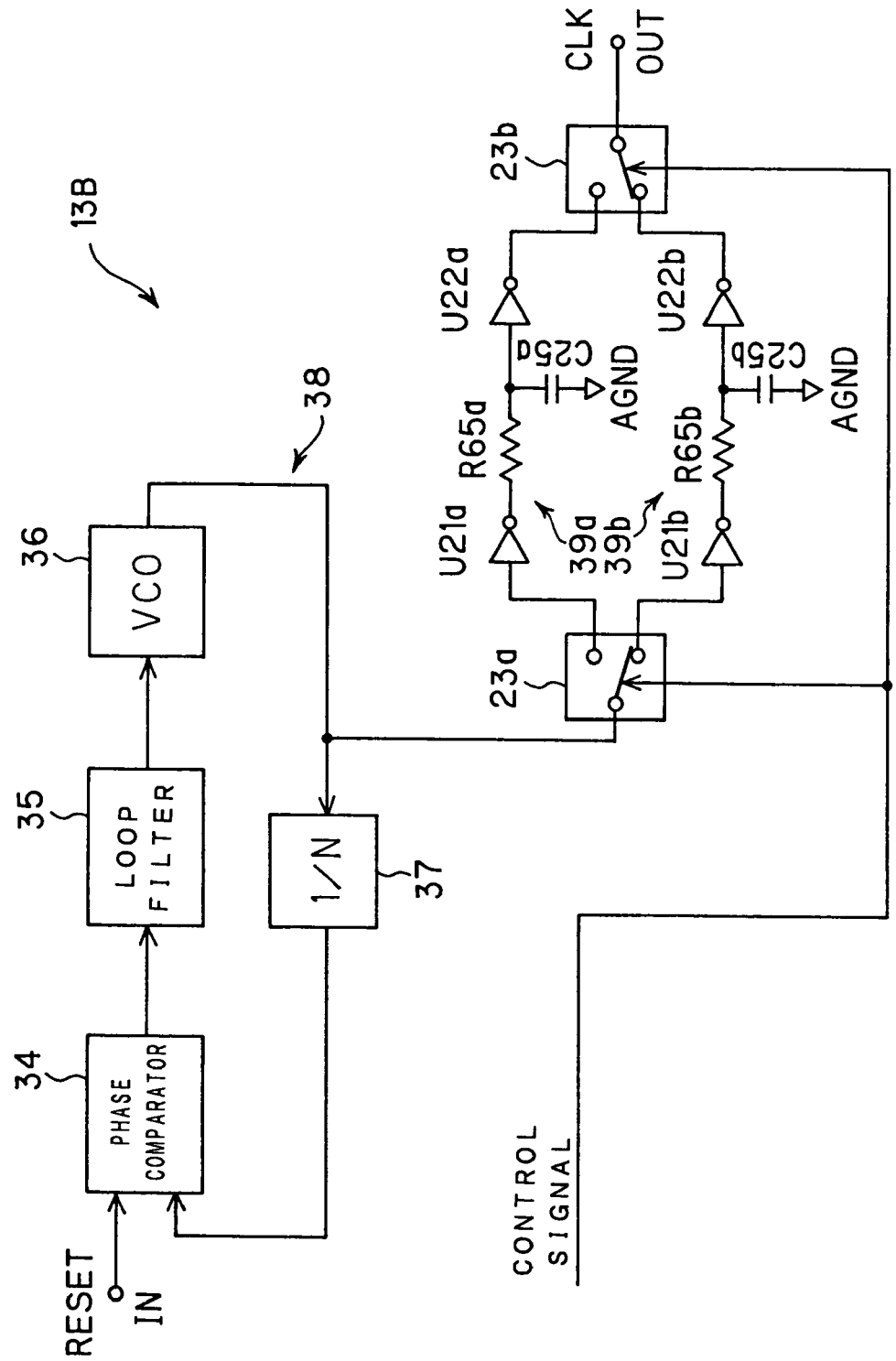

The delay circuit 13B of FIG. 20 is provided with two delay circuits 39a and 39b between the switches 23a and 23b, and is switched by the control signal from the PC 50.

Furthermore, in the delay circuit 39a, 39b, the delay amount is set by modifying the values of the resistor R65 and the capacitor C25 in the delay circuit 39 of FIG. 9. In FIG. 20, an example where two delay circuits 39a, 39b are switched is shown for the purpose of simplification, but three or more delay circuits may be switched in the same manner.

Figure 21:
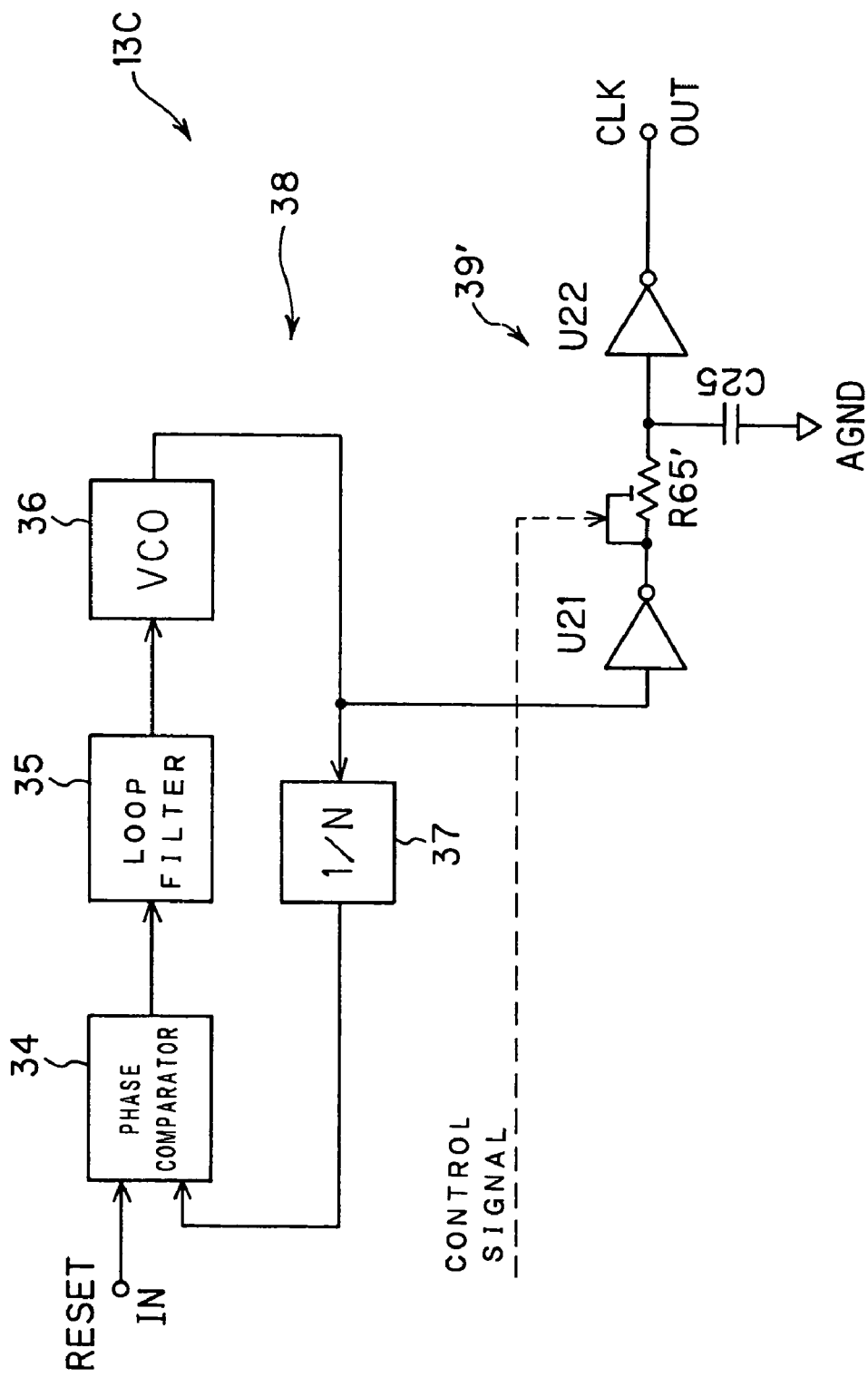

Further, the delay amount may be modified with one delay circuit 39' as in the PLL/delay circuit 13C shown in FIG. 21. For example, the resistor R65' constituting the delay circuit 39' is formed out of an electronic volume, and the value thereof can be set to be variable by the control signals from the PC 50.

Figure 22:
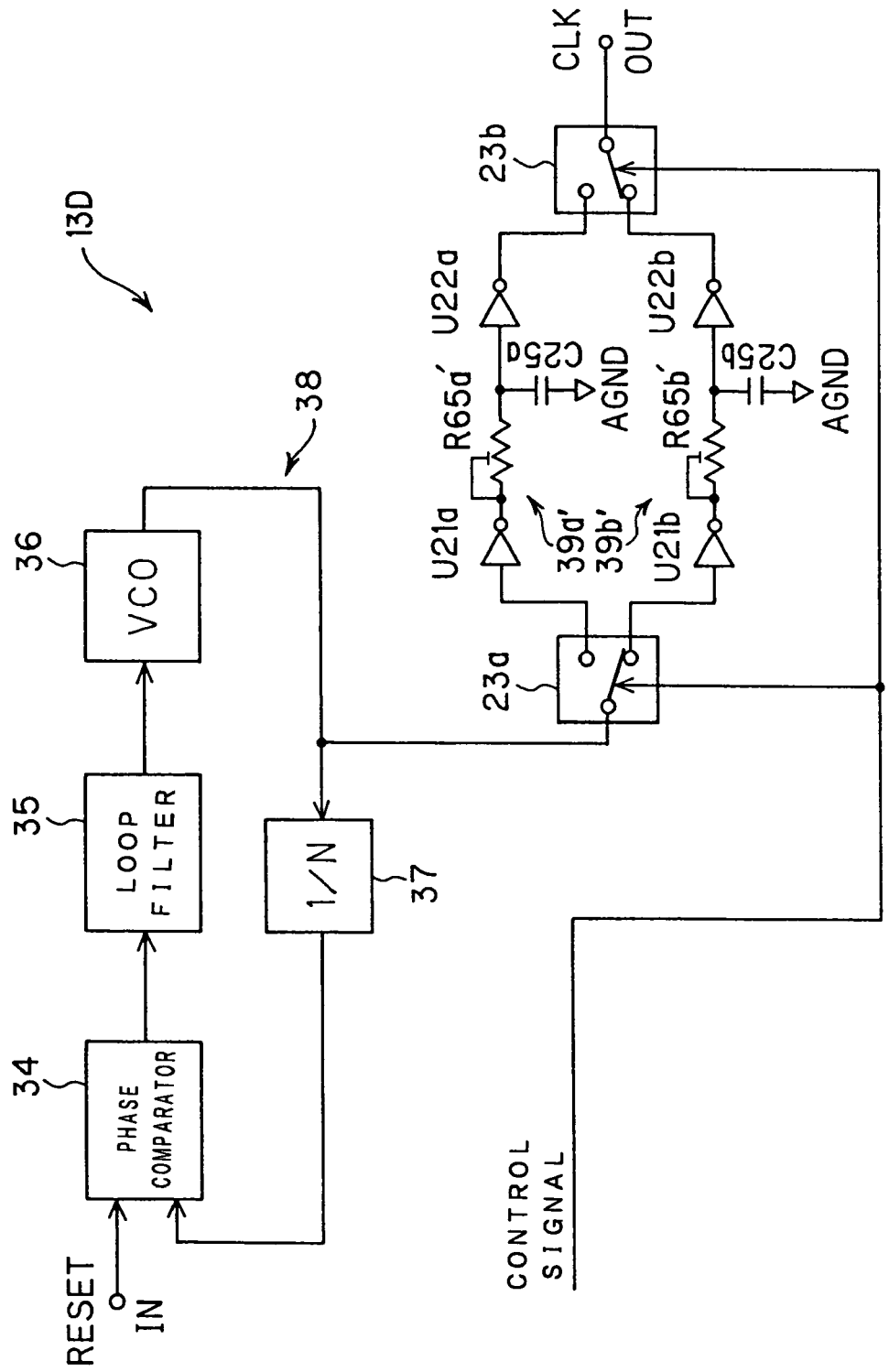

Furthermore, as shown in FIG. 22, a PLL/delay circuit 13D obtained by combining FIG. 20 and FIG. 21 may be constructed. That is, this PLL/delay circuit 13D includes delay circuits 39a' and 39b' in which the resistors R65a and R65b constituting the delay circuits 39a and 39b in FIG. 20 are replaced with variable resistors R65a' and R65b', respectively.

By forming the variable resistors R65a' and R65b' out of an electronic volume, the resistance values thereof can be variably controlled by the control signals from the PC 50, thereby setting a desired delay amount variably.

Next, operation for automating the board inspection of the video processor 6 by control using the PC 50 will be described.

(A) Adjustment of CCD Driving Pulse

The CCD driving pulse 8a is output from the driving pulse generating unit 8 of the video processor 6. Further, the driving pulse is input to the CCD-equivalent load circuit 2 (and the attenuator) of the image-signal generating apparatus 1B through the connection cable 5.

The signal 65a attenuated into a desired value by the attenuator is input to the meter (3) 53c via the coaxial cable 65 from the image-signal generating apparatus 1B, and the CCD driving pulse 8a is measured. The meter (3) 53c transmits the measured data to the PC 50.

The PC 50 compares the data obtained from the meter (3) 53c with the (optimum) target data previously stored in the memory means therein, and transmits data (the driving pulse width control signal 50a) on the difference between the pulse widths and data (the driving pulse gain control signal 50d) on the difference between the amplitudes thereof to the video processor 6.

The signal 50a input to the video processor 6 is input to the TG 61 and is converted into an analog quantity by the digital-to-analog converter of the TG 61, and this analog quantity serves as a control voltage of PLL of the TG 61. The VCO in the TG 61 changes the clock pulse which serves as a basis of the CCD driving pulse 8a, and outputs the changed clock pulse to the driving pulse generating unit 8.

The pulse width of the CCD driving pulse 8a output from the driving pulse generating unit 8 is adjusted into an optimum value.

The signal 50d is input to the gain control circuit 64, is converted into an analog quantity by the digital-to-analog converter in the gain control circuit 64, and the analog quantity is output as a signal 64a for controlling the source voltage to the amplifier of the driving pulse generating unit 8. This serves as the source voltage of the driving pulse generating unit 8. The value (level) of the amplitude of the CCD driving pulse 8a is adjusted automatically into an optimum value.

In this way, the automatic adjustment of the CCD driving pulse is performed.

(B) Adjustment of CDS Pulse

The CCD driving pulse 8a is output from the driving pulse generating unit 8 of the video processor 6, and is input to the CCD-equivalent load circuit 2 (and the attenuator) of the image-signal generating apparatus 1B via the connection cable 5.

The driving pulse is transferred through the connection cable 5 from the CCDout generating unit of the image-signal generating apparatus 1B, and is input to the CDS circuit 64 through the pre-amplifier 63 of the video processor 6.

The CDS pulse 61b and CCDout generated from the TG 61 are measured by the meter (3) 53c, and the measured data are transmitted to the PC 50.

The PC 50 compares the data obtained from the meter (3) 53c with the (optimum) target data previously stored in the memory means, etc. therein, and transmits a (CDS pulse phase) control signal 50b of reducing the difference therebetween to the video processor 6.

The control signal 50b transmitted to the video processor 6 is input to the TG 61, changes the phase of the CDS pulse 61b, and outputs the changed CDS pulse 61b to the CDS circuit 62.

In this way, the CDS pulse 61b output from the TG 61 of the video processor 6 is automatically adjusted to be output at the optimum timing (phase).

(C) Adjustment of CDS Gain

The output of the CDS circuit 62 is measured by the meter (3) 53c, and the measured data by the meter (3) 53c are transmitted to, the PC 50.

The PC 50 compares the data obtained from the meter (3) 53c with the (optimum) target data previously stored in the memory means therein, and transmits a (CDS gain) control signal 50c of reducing the difference therebetween to the video processor 6.

The control signal 50c transmitted to the video processor 6 is input to the CDS circuit 62, and the CDS circuit 62 changes the gain using the control signal 50c and outputs a signal of the sampled data portion.

In this way, the CDS circuit 62 is automatically adjusted to output the CDS output signal with the optimum level.

The respective circuits such as TG 61, the CDS circuit 62, etc. in the video processor 6 are provided with a memory circuit which stores the optimum state after being adjusted to the optimum state. For example, the PC 50 sends out the control signals together with data relating to the kinds of endoscopes and the kinds of CCDs, and the video processor 6 stores the values of the control signals for setting the optimum value relative to the data relating to the kinds of endoscopes and the kinds of CCDs, or the set values.

Therefore, when the endoscope is connected after the adjustment, the optimum set values corresponding to the kind of the endoscope and the CCD mounted on the endoscope are read out from the memory circuits, and the TG 61, the CDS circuit 62, etc. in the video processor 6 can be set to the optimum state.

Further, since the image-signal generating apparatus 1 can be controlled by the PC 50, the changing of kinds of CCDs and the delay amounts of a cable, the changing of charts, etc. can be performed automatically, so that it is possible to largely reduce the number of inspection processes.

Specifically, as shown in FIG. 19, the switching of the CCD-equivalent load circuits Z1, Z2, . . . , which are equivalent to various CCDs allows the inspection (adjustment) corresponding to various CCDs to be automatically performed by communicating and switching the relays 21a, 21b by the control signals from the PC 50.

Further, as shown in FIG. 20, since the delay circuits 39a and 39b having different delay amounts (set correspondingly to the lengths of cables) in the PLL/delay circuit 13B can be switched in communication with the switches (or relays) 23a and 23b using the control signals from the PC 50, it is possible to cope with endoscopes having different cable lengths.

Furthermore, as described in the first embodiment, in the image-signal generating apparatus 1B, data relating to various charts such as white, color bar, gray scale, etc. are stored in the memory comprising ROM, etc., and these data can be simply changed using the control signal from the PC 50. For this reason, it is possible to accomplish the automation of inspection.

According to the second embodiment, in addition to the advantages of the first embodiment, it is possible to automatically perform the switching operation of the inspection and adjustment or the adjustment operation in the first embodiment.

Through automation, it is possible to perform the inspection and adjustment of the video processor 6 simply and rapidly, and to perform the adjustment with high accuracy and small deviation. Furthermore, it is possible to provide a cheaper video processor.

Third Embodiment

Figure 23:
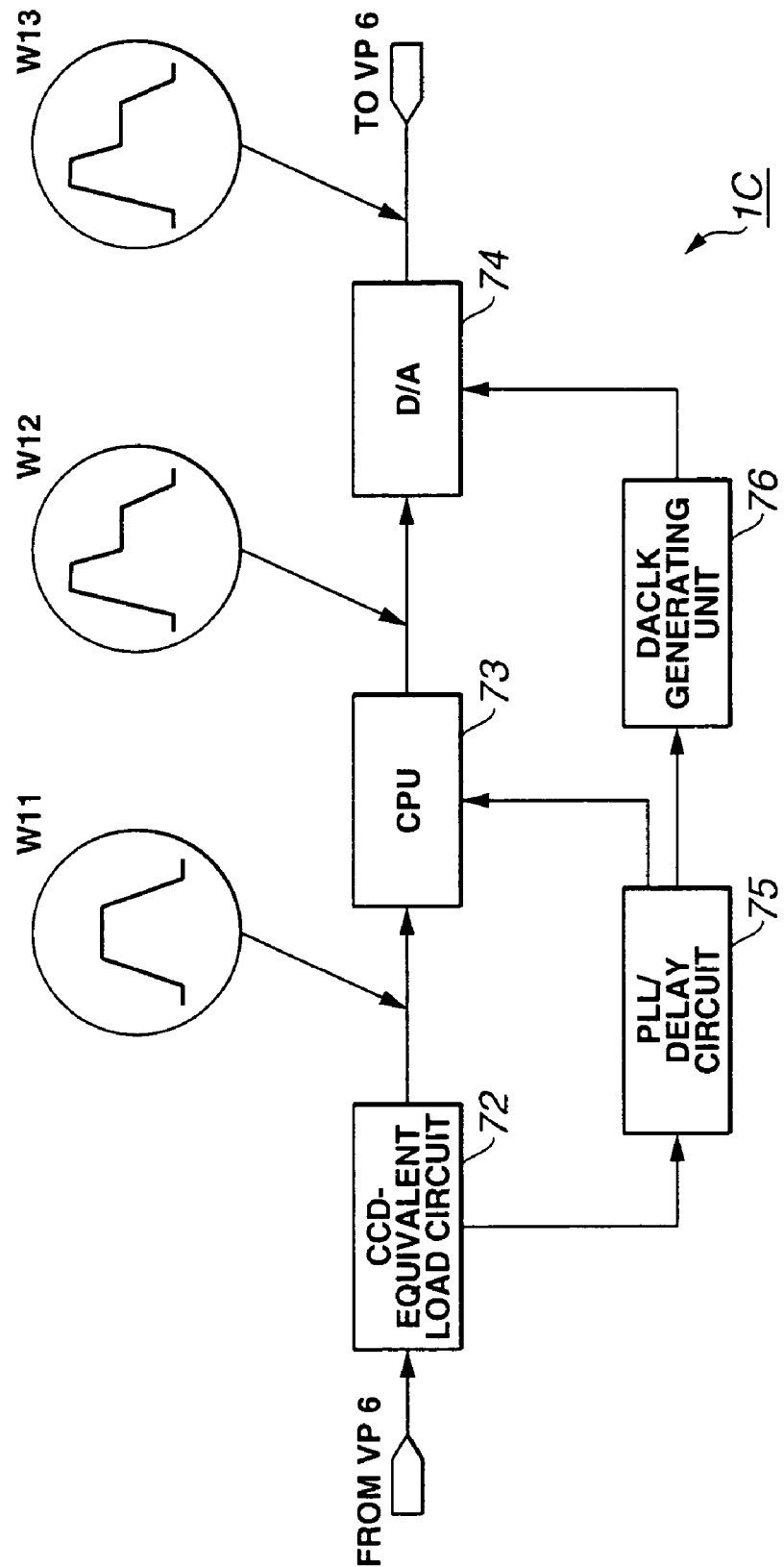
FIG. 23 is a diagram schematically illustrating a structure of an image-signal generating apparatus according to a third embodiment of the present invention.
Figure 24:
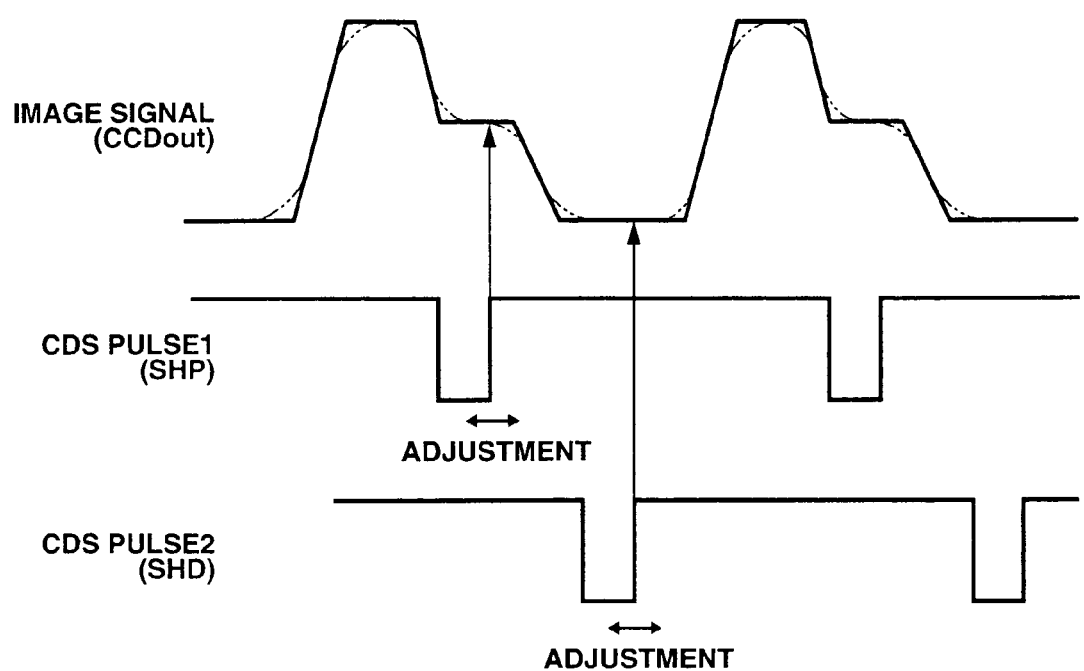
FIG. 24 is an explanatory diagram illustrating a state where a CDS pulse of performing a correlated double sampling (CDS) to an output signal of the CCD is adjusted.

Next, a third embodiment of the present invention will be described with reference to FIG. 23. FIG. 23 shows a structure of an image-signal generating apparatus 1C in which the signal generating process of CCDout is performed using a CPU (Central Processing Unit) 73.

The image-signal generating apparatus 1C comprises a CCD-equivalent load circuit 72 which receives a CCD driving pulse (of which the waveform is indicated in a circle by W11) output from the video processor 6 and has a load circuit equivalent to a CCD.

The image-signal generating apparatus 1C further comprises a CPU 73 which receives the CCD driving pulse terminated by the CCD-equivalent load circuit 72 and outputs signal data (of which the waveform is indicated in a circle by W12) having a three-valued waveform, and a digital-to-analog converter 74 which converts the signal data input from the CPU 73 into an analog signal, varies the amplitude and level thereof to desired values, and outputs the output signal of CCDout (of which the waveform is indicated in a circle by W13).

The image-signal generating apparatus 1C further comprises a PLL/delay circuit 75 which receives the CCD driving pulse terminated by the CCD-equivalent load circuit 72, generates a clock in synchronism with the CCD driving pulse, applies the delay amount of cable mainly due to the scope cable, and outputs the delay amount of cable to the CPU 73, and a DACLK generating unit 76 which adjusts the phase of the reference clock generated in the PLL/delay circuit 75 and outputs the adjusted reference clock to the digital-to-analog converter 74.

In the third embodiment, the CCD-equivalent load circuit 72 can be constructed as shown in FIG. 5 or 19. In a case of FIG. 19, the CCD-equivalent load circuits Z1, Z2, corresponding to various CCDs can be selected using the control signal from the CPU 73.

The PLL/delay circuit 75 can be constructed as shown in FIG. 20, 21, or 22, and the delay circuits corresponding to the delay amounts of cable can be selectively determined using the control signal from the CPU 72.

Then, by allowing the CPU 73 to operate in accordance with a program not shown, even when the kinds of CCDs or the delay amounts of cable are different, it is possible to perform the inspection and adjustment of the video processor 6 without using the head jig.

That is, the third embodiment has the same advantages as the first embodiment, and it is also possible to more simply perform the switching the CCD-equivalent load circuit 71 or the selective switching of the delay circuit for generating the delay amount corresponding to the delay time depending upon the cable lengths, compared with the first embodiment.

In the aforementioned embodiments, it is possible to cope with any of signal standards such as NTSC/PAL/SECOM by using the video processor 6 which is an inspection target. That is, the image-signal generating apparatus according to the present invention can generated image signals capable of coping with any of signal standards such as NTSC/PAL/SECOM.

For example, in the second embodiment, using the control signals from the PC 50 in accordance with the signal standard of NTSC/PAL/SECOM which is actually used or set as the video processor 6, the image-signal generating circuit 3 side and the video processor 6 side may be controlled by the image-signal generating apparatus 1B.

Further, even when the video processor 6 can cope with any signal standard of NTSC/PAL/SECOM, the image-signal generating apparatus 1B and the video processor 6 may be automatically controlled so as to sequentially switch the signal standards of NTSC, PAL, and SECOM.

In the above description, although a synchronous video processor for performing the image pickup and the signal processing to an endoscope comprising a CCD having a filter for optically separating colors provided in the front of the image pickup surface of the CCD, that is, a CCD capable of picking up color images under white illumination as a CCD has been described as an inspection target, the present invention is not limited to it, but may be applied to a case where a surface-sequential video processor for performing the image pickup and the signal processing in a surface-sequential manner is used as an inspection target.

That is, the present invention can provide an image-signal generating apparatus which can be used for the inspection of the synchronous and surface-sequential video processors. For this reason, for example, the image-signal generating circuit 3 side and the video processor 6 side may be controlled by the image-signal generating apparatus 1B, using the PC 50 in accordance with the synchronous and surface-sequential video processor.

Further, embodiments constructed by partially combining the first to third embodiments described above belong to the present invention.

Furthermore, the image-signal generating apparatus according to the present invention is not limited to the inspection and adjustment of the endoscope and the television camera mounted with a solid-state image pickup device, but may be widely used for the inspection of other image instruments.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A simulated image-signal generating apparatus for generating a simulated image signal, comprising:
    a load circuit unit constructed of a passive element which does not have a photoelectric conversion function without an actual solid-state image pickup device, and having an impedance value approximately equivalent to an impedance value of an actual solid-state image pickup device, the load circuit unit outputting a load output signal by application of a driving signal for driving the actual solid-state image pickup device to be synchronized with the driving signal; and
    a simulated image-signal generating circuit generating and outputting a simulated image signal that imitates an actual image signal of the actual solid-state image pickup device based on the load output signal.

2. The simulated image-signal generating apparatus according to claim 1, wherein the simulated image signal is a first output and the load circuit unit has a plurality of load circuits having impedance values, which are approximately equivalent to different types of actual solid-state image pickup devices, the simulated image signal being varied in accordance with the impedance values.

3. The simulated image-signal generating apparatus according to claim 2, further comprising selection means for selecting one load circuit out of the plurality of load circuits and outputting a second output differing from the first output in accordance with an impedance value of a load.

4. The simulated image-signal generating apparatus according to claim 2, wherein the plurality of load circuits are automatically selected by a control device.

5. The simulated image-signal generating apparatus according to claim 1, wherein the load circuit unit includes load circuits which use elements having a variable impedance value, and operates the plurality of load circuits which are approximately equivalent to different types of actual solid-state image pickup devices by varying the impedance value of the elements.

6. The simulated image-signal generating apparatus according to claim 1, wherein the actual solid-state image pickup device is a charge coupled device, and the image signal is a charge coupled device output signal corresponding to an output signal of the charge coupled device.

7. The simulated image-signal generating apparatus according to claim 6, wherein the simulated image-signal generating circuit has a reset-pulse generating circuit for generating a pulse corresponding to a reset portion of the output signal of the charge coupled device.

8. The simulated image-signal generating apparatus according to claim 6, wherein the simulated image-signal generating circuit has a memory circuit for storing data of various charts.

9. The simulated image-signal generating apparatus according to claim 7, wherein the simulated image-signal generating circuit has a memory circuit for storing data of various charts.

10. The simulated image-signal generating apparatus according to claim 9, further comprising a digital-to-analog converter circuit for performing digital-to-analog conversion on a pulse obtained from the memory circuit to generate a pulse corresponding to a data portion of the output signal of the charge coupled device.

11. The simulated image-signal generating apparatus according to claim 10, further comprising a charge coupled device output signal generating circuit for synthesizing a pulse output from the reset-pulse generating circuit and a data pulse output from the digital-to-analog converter circuit and for outputting the synthesized pulse as the charge coupled device output signal.

12. The simulated image-signal generating apparatus according to claim 6, further comprising a delay circuit for delaying the charge coupled device output signal by a predetermined delay amount.

13. The simulated image-signal generating apparatus according to claim 11, further comprising a delay circuit for delaying the charge coupled device output signal output from the charge coupled device output signal generating circuit by a predetermined delay amount.

14. The simulated image-signal generating apparatus according to claim 7, wherein the reset-pulse generating circuit obtains a solid-state image pickup device driving pulse generated from the internal substrate of an endoscope video processor and generates a pulse corresponding to the reset portion of the charge coupled device output signal synchronized with the solid-state image pickup device driving pulse on the basis of the solid-state image pickup device driving pulse.

15. The simulated image-signal generating apparatus according to claim 7, wherein the reset-pulse generating circuit freely varies the width and amplitude of a pulse corresponding to the reset portion of the output signal of the charge coupled device by varying an element for determining the width and the amplitude of the pulse.

16. The simulated image-signal generating apparatus according to claim 10, wherein the digital-to-analog converter circuit freely varies the width and amplitude of a pulse corresponding to the data portion of the output signal of the charge coupled device by varying an element for determining the width and the amplitude of the pulse.

17. The simulated image-signal generating apparatus according to claim 11, wherein the charge coupled device output signal generating circuit generates a charge coupled device output signal by synthesizing the pulse corresponding to the reset portion of the charge coupled device output signal obtained from the reset-pulse generating circuit and the pulse corresponding to the data portion of the charge coupled device output signal obtained from the digital-to-analog converter circuit, and freely varies the amplitude of the charge coupled device output signal by varying an element for determining the amplitude.

18. The simulated image-signal generating apparatus according to claim 12, wherein the delay circuit generates a delay amount corresponding to a delay time due to the length of an endoscope cable.

19. The simulated image-signal generating apparatus according to claim 12, wherein the delay circuit has a plurality of delay units for generating a delay amount corresponding to a delay time due to the length of an endoscope cable, and the plurality of delay units is switchable.

20. The simulated image-signal generating apparatus according to claim 12, wherein the delay circuit varies the delay amount corresponding to a delay time by controlling a variable element which is capable of varying the delay amount.

21. The simulated image-signal generating apparatus according to claim 1, wherein the simulated image-signal generating circuit generates an image signal which is approximately equivalent to an output signal of the actual solid-state image pickup device.

22. The simulated image-signal generating apparatus according to claim 1, wherein the simulated image-signal generating circuit generates an image signal which is approximately equivalent to an output signal of the actual solid-state image pickup device and has a waveform having a smaller distortion than that of the output signal of the actual solid-state image pickup device.

23. The simulated image-signal generating apparatus according to claim 1, wherein the simulated image-signal generating circuit generates an image signal which is approximately equivalent to an output signal of a charge coupled device serving as the actual solid-state image pickup device and has a waveform having a smaller distortion than that of the output signal of the charge coupled device.

24. The simulated image-signal generating apparatus according to claim 23, wherein the simulated image-signal generating circuit generates an image signal having a waveform in which boundaries between a reset portion, a feed-through portion, and a data portion of the output signal of the charge coupled device are identifiable.

25. The simulated image-signal generating apparatus according to claim 1, further comprising a connector which is detachably connected to an image-signal processing apparatus, which comprises a driving-signal generating unit for generating a driving signal for driving the actual solid-state image pickup device and a signal processing unit for performing signal processing in order to generate a standard image signal from the image signal corresponding to an output signal output from the actual solid-state image pickup device by applying the driving signal.

26. The simulated image-signal generating apparatus according to claim 25, wherein the image-signal processing apparatus is an endoscopic signal processing circuit which is inserted into a body cavity, etc., is connected to an electronic endoscope having the actual solid-state image pickup device, and is used for endoscopy.

27. A method of inspecting an endoscope video processor to which an electronic endoscope having an actual solid-state image pickup device mounted thereto is connected,
wherein the method is performed using a simulated image-signal generating apparatus comprising:
a load circuit unit constructed of a passive element which does not have a photoelectric conversion function without the actual solid-state image pickup device and having an impedance value approximately equivalent to an impedance value of the actual solid-state image pickup device, the load circuit unit outputting a load output signal by application of a driving signal for driving the actual solid-state image pickup device to be synchronized with the driving signal; and
a simulated image-signal generating circuit generating a simulated image signal corresponding to an actual output signal output from the actual solid-state image pickup device based on the load output signal.

28. The method of inspecting an endoscope video processor according to claim 27, wherein the actual solid-state image pickup device is a charge coupled device, and the simulated image signal is a charge coupled device output signal corresponding to an output signal of the charge coupled device.

29. The image-signal generating apparatus according to claim 1, wherein the solid-state image pickup device-equivalent load circuit unit is constructed of a resistance device and a capacitance device as the passive device.

30. The image-signal generating apparatus according to claim 1, wherein two terminals of the load circuit unit are applied with the driving signal for driving the actual solid-state image pickup device.

31. The method of inspecting an endoscope video processor according to claim 27, wherein two terminals of the load circuit unit are applied with the driving signal for driving the actual solid-state image pickup device.

* * * * *